(12) United States Patent
Jung et al.

(10) Patent No.: US 12,461,631 B2
(45) Date of Patent: Nov. 4, 2025

(54) DISPLAY DEVICE

(71) Applicant: Samsung Display Co., Ltd., Yongin-si (KR)

(72) Inventors: Soo-Young Jung, Hwaseong-si (KR); Sungjun Kim, Yongin-si (KR); Sung Jae Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 785 days.

(21) Appl. No.: 17/446,940

(22) Filed: Sep. 3, 2021

(65) Prior Publication Data
US 2022/0199949 A1   Jun. 23, 2022

(30) Foreign Application Priority Data
Dec. 17, 2020   (KR) .................. 10-2020-0177150

(51) Int. Cl.
*G06F 3/044* (2006.01)
*H10K 50/844* (2023.01)
(Continued)

(52) U.S. Cl.
CPC ......... *G06F 3/0446* (2019.05); *H10K 50/844* (2023.02); *H10K 50/865* (2023.02);
(Continued)

(58) Field of Classification Search
CPC .... H10K 50/844; H10K 50/865; H10K 59/40; H10K 59/122; G06F 3/044; G06F 3/0446; G06F 2203/04112; H01L 27/15; H01L 27/32; H01L 33/38; H01L 51/00; H01L 51/50; H01L 51/52; H01L 51/56; G09G 3/00; G09G 3/20; G09G 3/3208; G09G 3/3225; G09G 3/3266; G09G 3/3275
See application file for complete search history.

(56) References Cited

U.S. PATENT DOCUMENTS 8,059,234 B2   11/2011   Tsao et al.
11,003,268 B2   5/2021   Choi et al.
(Continued)

FOREIGN PATENT DOCUMENTS

KR   10-2017-0001935 A   1/2017
KR   10-2019-0062678     6/2019
(Continued)

*Primary Examiner* — Chanh D Nguyen
*Assistant Examiner* — Nguyen H Truong
(74) *Attorney, Agent, or Firm* — Womble Bond Dickinson (US) LLP

(57) ABSTRACT

A display device includes: a display panel including an emission region, and a peripheral region adjacent to the emission region, the emission region including a light emitting element; at least one insulating layer on the display panel; an organic layer on the at least one insulating layer, the organic layer having an opening corresponding to the emission region; and a planarization layer on the organic layer, and filling the opening. The opening has a shape including first vertices and second vertices in a plan view, each of the first vertices has an internal angle of 90° or less, and in the plan view, each of the first vertices is located farther from a center of the opening than a corresponding adjacent second vertex from among the second vertices.

19 Claims, 19 Drawing Sheets

(51) Int. Cl.
  *H10K 50/86* (2023.01)
  *H10K 59/122* (2023.01)
  *H10K 59/40* (2023.01)
  *H10K 59/80* (2023.01)

(52) U.S. Cl.
  CPC .......... *H10K 59/122* (2023.02); *H10K 59/40* (2023.02); *H10K 59/8792* (2023.02); *G06F 2203/04112* (2013.01)

(56) References Cited

U.S. PATENT DOCUMENTS

| | | | | |
|---|---|---|---|---|
| 2010/0079393 | A1* | 4/2010 | Dews | G06F 3/0448 |
| | | | | 345/173 |
| 2016/0154510 | A1* | 6/2016 | Ide | G06F 3/0412 |
| | | | | 345/174 |
| 2016/0378224 | A1* | 12/2016 | Kwon | H10K 50/865 |
| | | | | 345/174 |
| 2017/0092825 | A1* | 3/2017 | Bando | H01L 33/60 |
| 2017/0123546 | A1* | 5/2017 | Zhan | G06F 3/0446 |
| 2017/0269728 | A1* | 9/2017 | Donnelly | G06F 3/0443 |
| 2017/0278899 | A1* | 9/2017 | Yang | H10K 77/111 |
| 2019/0114011 | A1* | 4/2019 | Kim | G06F 3/044 |
| 2019/0123112 | A1* | 4/2019 | Lee | H10K 50/84 |
| 2019/0165061 | A1* | 5/2019 | Jung | H10K 50/844 |
| 2020/0154564 | A1* | 5/2020 | Maki | F21V 23/00 |
| 2022/0253181 | A1* | 8/2022 | Ouyang | G06F 3/0446 |

FOREIGN PATENT DOCUMENTS

| | | |
|---|---|---|
| KR | 10-2019-0109854 | 9/2019 |
| KR | 10-2019-0110538 A | 9/2019 |
| KR | 10-2198230 B1 | 1/2021 |
| KR | 10-2021-0050031 A | 5/2021 |

* cited by examiner

DISPLAY DEVICE

CROSS-REFERENCE TO RELATED APPLICATION

This application claims priority to and the benefit of Korean Patent Application No. 10-2020-0177150, filed on Dec. 17, 2020, in the Korean Intellectual Property Office, the entire disclosure of which is incorporated by reference herein.

BACKGROUND

Aspects of embodiments of the present disclosure relate to a display device, and more particularly, to a display device having improved display quality.

Electronic devices, such as smart phones, tablets, notebook computers, car navigation systems, and smart televisions, have been developed. These electronic devices include a display device to provide information.

There may be a demand for a display device with low power and high efficiency.

SUMMARY

One or more embodiments of the present disclosure are directed to a display device having a reduced defect rate.

According to one or more embodiments of the present disclosure, a display device includes: a display panel including an emission region, and a peripheral region adjacent to the emission region, the emission region including a light emitting element; at least one insulating layer on the display panel; an organic layer on the at least one insulating layer, the organic layer having an opening corresponding to the emission region; and a planarization layer on the organic layer, and filling the opening. The opening has a shape including first vertices and second vertices in a plan view, each of the first vertices has an internal angle of 90° or less, and in the plan view, each of the first vertices is located farther from a center of the opening than a corresponding adjacent second vertex from among the second vertices.

In an embodiment, each of the second vertices may have an internal angle greater than 90° and less than 270°.

In an embodiment, a number of the first vertices may be equal to m, where m is a natural number greater than or equal to 4.

In an embodiment, each of the second vertices may be located between two corresponding first vertices that are adjacent to each other from among the first vertices, and a number of the second vertices may be greater than or equal to m−2.

In an embodiment, the number of the first vertices may be equal to a number of the second vertices, and may be an even number.

In an embodiment, the opening may have a polygonal shape in the plan view having n or more sides, where n is a natural number greater than or equal to 6.

In an embodiment, the opening may be defined by a plurality of sides in the plan view, each of the plurality of sides may connect two corresponding vertices that are closest to each other from among the first vertices and the second vertices, and each of the plurality of sides may be a straight side.

In an embodiment, the opening may be defined by a plurality of sides in the plan view, each of the plurality of sides may connect two corresponding vertices that are closest to each other from among the first vertices and the second vertices, and one of the plurality of sides may be a curved side.

In an embodiment, the display device may further include: a light blocking pattern on the organic layer, and overlapping with the peripheral region.

In an embodiment, a refractive index of the planarization layer may be greater than a refractive index of the organic layer.

In an embodiment, the organic layer may include an inclined surface defining the opening, and an obtuse angle may be defined between an upper surface of the at least one insulating layer that is exposed from the opening and the inclined surface.

In an embodiment, the display device may further include: an input sensor configured to detect an external input. The input sensor may include a conductive mesh line overlapping with the peripheral region, and defining a sensor opening corresponding to the emission region. The conductive mesh line may be located between the at least one insulating layer and the organic layer.

In an embodiment, the display panel may further include a pixel defining layer having an emission opening defining the emission region, the light emitting element may include a first electrode, an emission layer on the first electrode, and a second electrode on the emission layer, the emission opening may expose a part of the first electrode, and the emission opening may be located inside the opening in the plan view.

In an embodiment, the emission opening may have a shape including a plurality of vertices, each of the vertices having an internal angle of 90°.

In an embodiment, the planarization layer may include a base resin, and particles mixed with the base resin, and the particles may include at least one of Zirconia ($ZrO_2$), Titania ($TiO_2$), or Silica ($SiO_2$).

In an embodiment, the base resin may include at least one of an acrylate-based resin, an epoxide-based resin, a siloxane-based resin, a polyimide-based resin, a zirconium and hafnium acrylates-based resin, or a brominated aromatic acrylate-based resin.

According to one or more embodiments of the present disclosure, a display device includes: a display panel including an emission region, and a peripheral region adjacent to the emission region; an organic layer on the display panel, the organic layer having an opening corresponding to the emission region; and a planarization layer on the organic layer, and filling the opening. The opening has a shape including first vertices and second vertices in a plan view, each of the first vertices has an internal angle of 90° or less, and each of the second vertices has an internal angle greater than 90°. In the plan view, each of the first vertices is located farther from a center of the opening than a corresponding adjacent second vertex from among the second vertices, and a number of the first vertices is greater than or equal to 6, and is an even number.

In an embodiment, the shape of the opening in the plan view may be symmetrical with respect to a virtual line passing through a center of the opening.

In an embodiment, the display panel may further include a pixel defining layer having an emission opening defining the emission region, and a light emitting element located to correspond to the emission opening. The light emitting element may include a first electrode, an emission layer on the first electrode, and a second electrode on the emission layer, the emission opening may expose a part of the first electrode, and the emission opening may be located inside the opening in the plan view.

In an embodiment, the emission opening may have a shape including a plurality of vertices, each of the vertices having an internal angle of 90°.

BRIEF DESCRIPTION OF THE FIGURES

The above and other aspects and features of the present disclosure will be more clearly understood from the following detailed description of the illustrative, non-limiting example embodiments with reference to the accompanying drawings, in which.

DETAILED DESCRIPTION

Figure 1A:
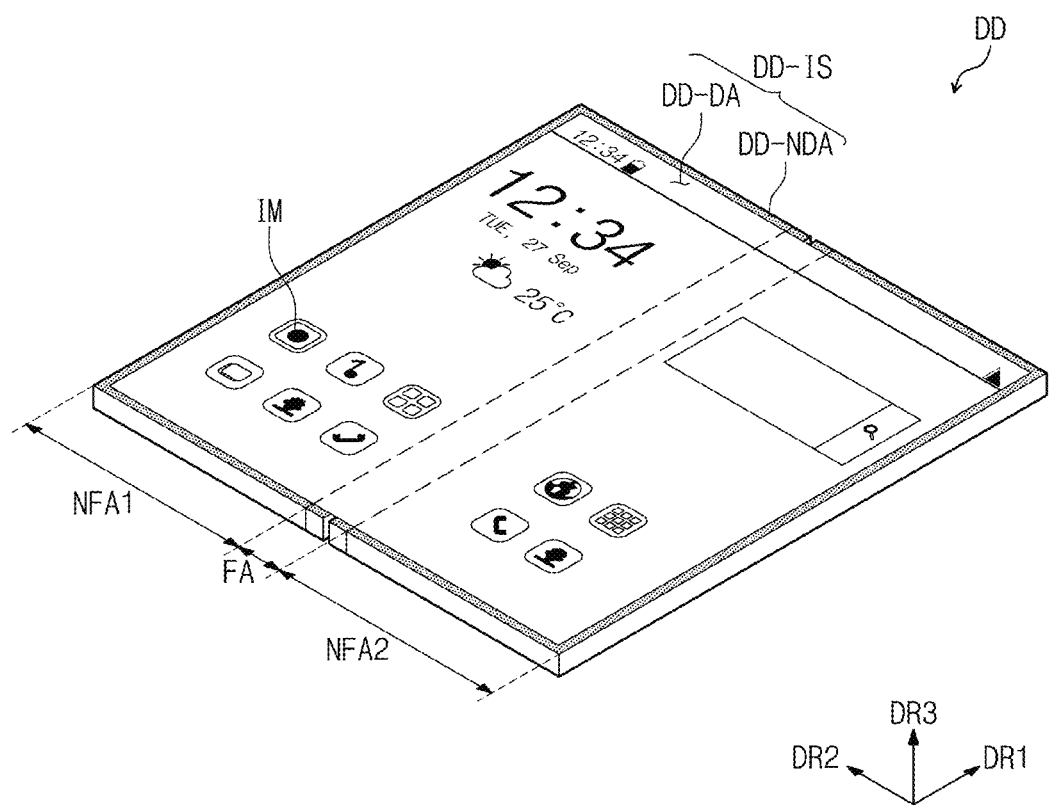
FIGS. 1A-1C are perspective views of a display device according to an embodiment of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. These terms are relative, and are described with reference to the directions indicated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, a first direction axis DR1, a second direction axis DR2, and a third direction axis DR3 are not limited to three axes of the rectangular coordinate system, and may be interpreted in a broader sense. For example, the first direction axis DR1, the second direction axis DR2, and the third direction axis DR3 may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
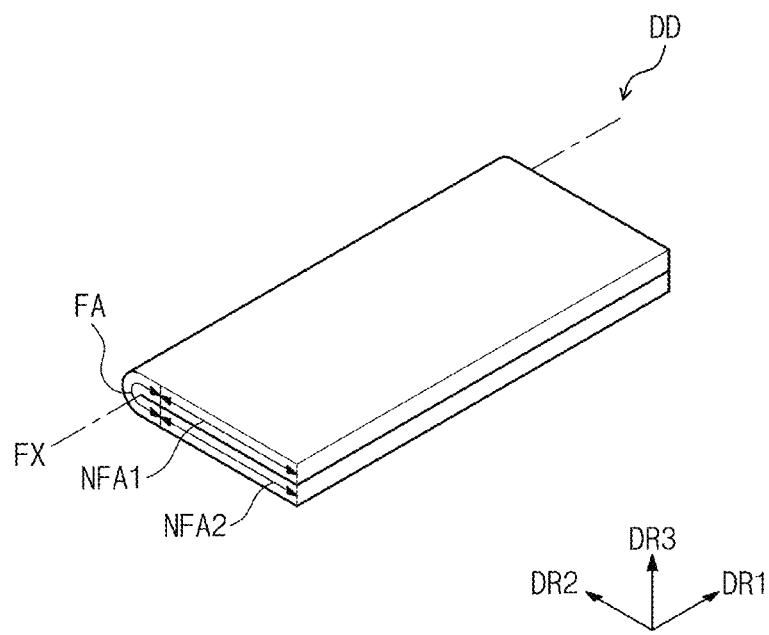
Figure 1C:
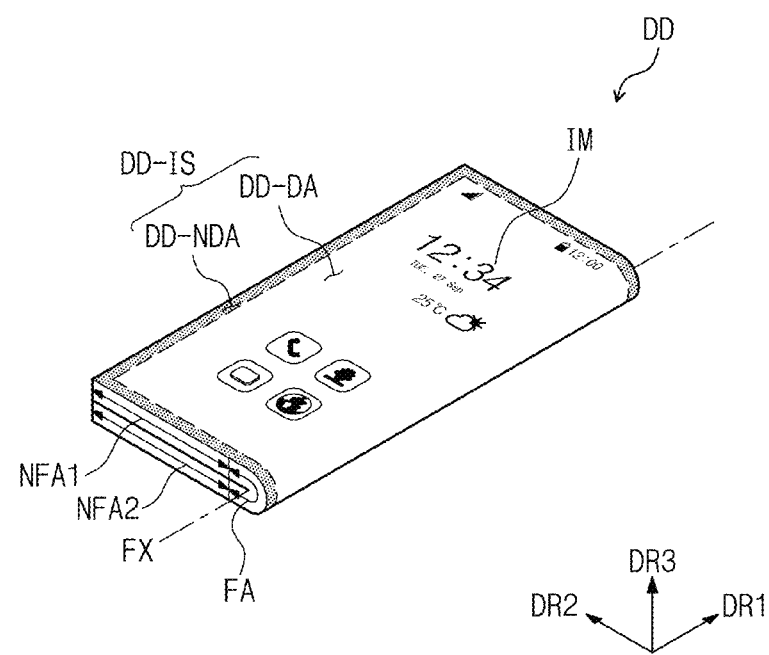

FIGS. 1A to 1C are perspective views of a display device according to an embodiment of the present disclosure.

As illustrated in FIGS. 1A to 1C, a display device DD includes a display surface DD-IS that is parallel to or substantially parallel to a plane defined by a first direction axis DR1 and a second direction axis DR2. A third direction axis DR3 indicates a perpendicular or substantially perpendicular direction of the display surface DD-IS, or in other words, a thickness direction of the display device DD. A front surface (or an upper surface) and a rear surface (or a lower surface) of each member may be distinguished based on the third direction axis DR3. Hereinafter, first to third directions are directions indicated by the first to third direction axes DR1, DR2, and DR3, respectively, and are referred to by using the same reference symbols.

As illustrated in FIGS. 1A to 1C, the display surface DD-IS includes a display area DD-DA at (e.g., in or on) which an image IM is displayed, and a non-display area DD-NDA adjacent to the display area DD-DA. The non-display area DD-NDA is an area at (e.g., in or on) which an image is not displayed. FIGS. 1A to 1C illustrate icon images as an example of the image IM, but the present disclosure is not limited thereto. As an example, the display area DD-DA may have a rectangular shape. The non-display area DD-NDA may surround (e.g., around a periphery of) the display area DD-DA. However, the present disclosure is not limited thereto, and the shape of the display area DD-DA and the shape of the non-display area DD-NDA may be variously modified as needed or desired.

As illustrated in FIGS. 1A to 1C, the display device DD may include a plurality of areas defined according to an operation type (e.g., an operation state). The display device DD may include a folding area FA that may be folded on the basis of a folding axis FX, and a first flat area NFA1 and a second flat area NFA2, which are adjacent to the folding area FA. The folding area FA is an area that forms or substantially forms a curvature (e.g., when the display device DD is folded).

In the present embodiment, the folding axis FX of the display device DD is shown as being parallel to or substantially parallel to the first direction DR1 as an example. However, the present disclosure is not limited thereto, and the folding axis FX may be parallel to or substantially parallel to the second direction DR2, for example.

As illustrated in FIG. 1B, the display device DD may be inner-folded or inner-bent, such that the display surface DD-IS of the first flat area NFA1 and the display surface DD-IS of the second flat area NFA2 face each other. As illustrated in FIG. 1C, the display device DD may be outer-folded or outer-bent, such that the display surface DD-IS is exposed to the outside.

In an embodiment of the present disclosure, the display device DD may include a plurality of folding areas FA. In addition, the folding area FA may be defined to correspond to a form in which a user manipulates the display device DD. For example, the folding area FA may be defined in a diagonal direction crossing the first direction axis DR1 and the second direction axis DR2 in a plan view. The area of the folding area FA may not be fixed, and may be determined depending on a radius of curvature. In an embodiment of the present disclosure, the display device DD may be configured to repeat only the operation modes (e.g., the operation states) shown in FIGS. 1A and 1B, or may be configured to repeat only the operation modes (e.g., the operation states) shown in FIGS. 1A and 1C. In other words, in some embodiments, from the operation mode shown in FIG. 1A, the display device DD may be only inner-folded to be in the operation mode shown in FIG. 1B, or may be only outer-folded to be in the operation mode shown in FIG. 1C.

In the present embodiment, the display device DD is illustrated as applied to a mobile phone as an example, but the present disclosure is not limited thereto. In other embodiments of the present disclosure, the display device DD may be applied to a small-sized electronic device and/or a medium-sized electronic device, for example, such as a tablet, a car navigation system, a game machine, and/or a smart watch, in addition to a large-sized electronic device, for example, such as a television and/or a monitor.

In addition, the display device DD according to one or more embodiments of the present disclosure is not limited to a foldable display device. In an embodiment of the present disclosure, the display device DD may be a non-folding (e.g., a non-foldable) display device, or a rollable display device that may be rolled.

Figure 2:
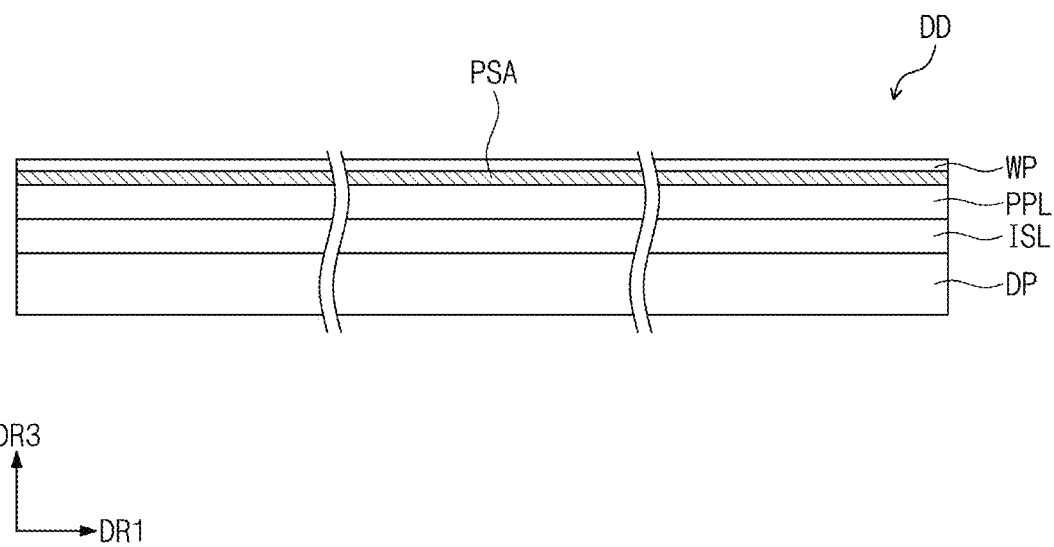
FIG. 2 is a cross-sectional view of a display device according to an embodiment of the present disclosure.

FIG. 2 is a cross-sectional view of a display device DD according to an embodiment of the present disclosure. FIG. 2 illustrates a cross section defined by the first direction axis DR1 and the third direction axis DR3. In FIG. 2, a simplified example of the display device DD is illustrated to describe a stacking structure of various functional panels and/or functional units constituting the display device DD.

The display device DD according to an embodiment of the present disclosure may include a display panel DP, an input sensor ISL, an optical control layer PPL, and a window WP. In an embodiment of the present disclosure, the input sensor ISL may be omitted as needed or desired.

According to an embodiment of the present disclosure, at least some components of the display panel DP, the input sensor ISL, the optical control layer PPL, and the window WP may be formed by a successive process, or at least some components thereof may be bonded to one another through an adhesive layer. The adhesive layer may not be disposed between the components formed by the successive process. In an embodiment, the adhesive layer may be a pressure sensitive adhesive (PSA) film. The adhesive layer described in more detail below may include a general adhesive or pressure-sensitive adhesive, but is not particularly limited.

The display panel DP generates an image. The display panel DP includes a plurality of pixels. The display panel DP may include a pixel area and a non-pixel area, which correspond to the display area DD-DA and the non-display area DD-NDA shown in FIG. 1A, respectively, in a plan view.

The display panel DP according to an embodiment of the present disclosure may be a light emitting display panel, but is not particularly limited. For example, the display panel DP may be an organic light emitting display panel or an inorganic light emitting display panel. An emission layer of the organic light emitting display panel may include an organic light emitting material. An emission layer of the inorganic light emitting display panel may include a quantum dot, a quantum rod, or an inorganic light-emitting diode (LED). Hereinafter, for convenience, the display panel DP will be described in more detail as an organic light emitting display panel.

The input sensor ISL is disposed on the display panel DP. The input sensor ISL obtains coordinate information of an external input (e.g., a touch event). The input sensor ISL may detect the external input in a capacitive method.

The optical control layer PPL may control a path of light (hereinafter, referred to as a "source light") generated by the display panel DP. The optical control layer PPL may condense the source light in a vertical direction (e.g., in the third direction DR3).

The optical control layer PPL may reduce a reflectance of natural light (or sunlight) incident from an upper side of the window WP. The optical control layer PPL according to an embodiment of the present disclosure may include a light blocking pattern. The optical control layer PPL according to an embodiment of the present disclosure may include color filters. The color filters have a suitable arrangement (e.g., a predetermined or given arrangement). The arrangement of the color filters may be determined in consideration of emission colors of the pixels included in the display panel DP. A color filter having the same color as that of a source light generated by a pixel is disposed to overlap with an emission region of the pixel.

The window WP according to an embodiment of the present disclosure includes a base layer and a bezel layer. The base layer may have a multilayered structure. The base layer may include an organic substrate or a synthetic resin film.

The bezel layer partially overlaps with the base layer. The bezel layer may define a bezel area of the display device DD, or in other words, the non-display area DD-NDA (e.g., refer to FIG. 1). In an embodiment of the present disclosure, the bezel layer may be disposed in a different configuration (e.g., in a configuration that is the same or substantially the same as that of the optical control layer PPL), or may be omitted.

In some embodiments, a protective member may be further disposed under (e.g., underneath) the display panel DP. The protection member supports the display panel DP, and protects the display panel DP from an external impact.

Figure 3:
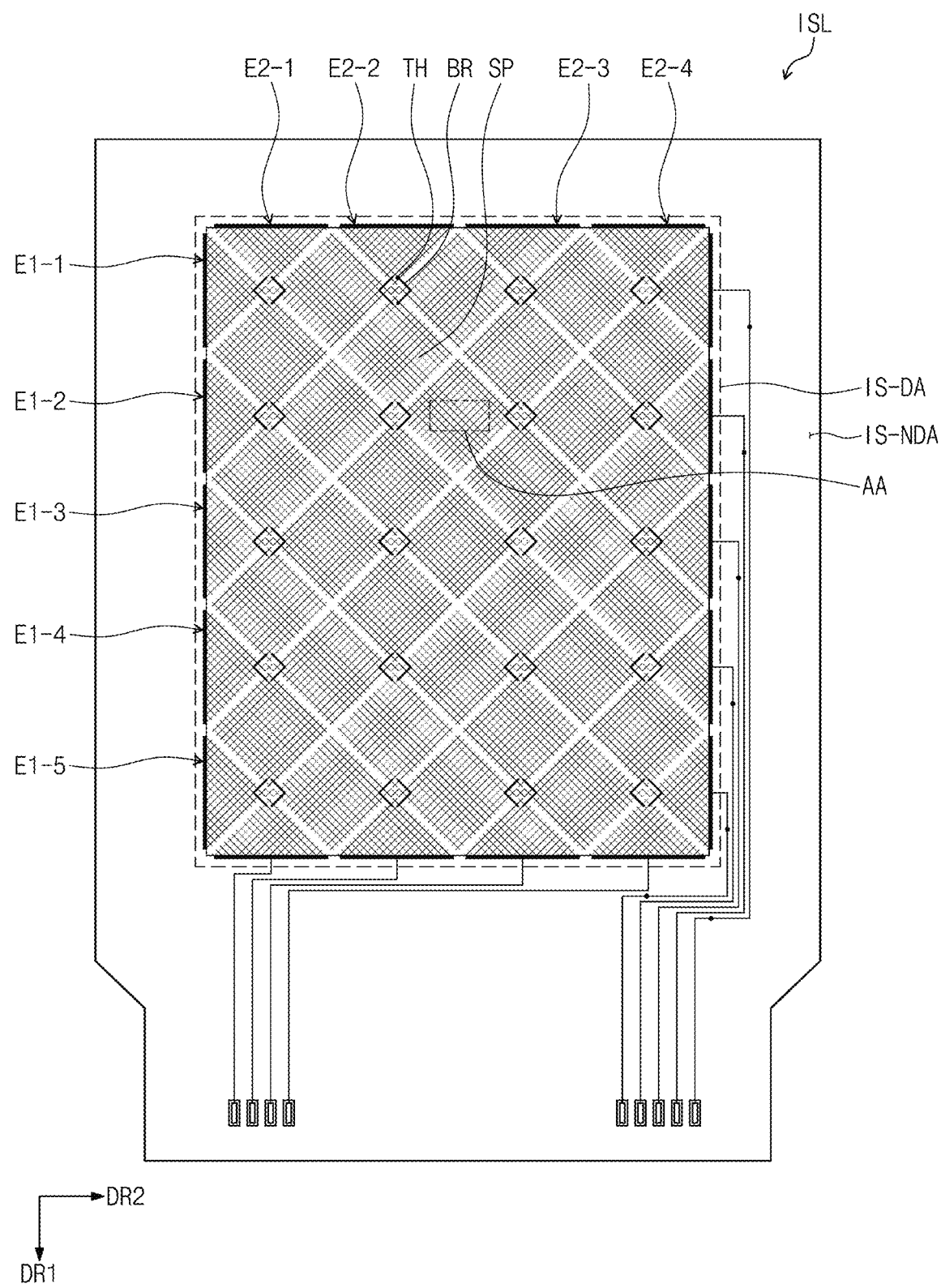
FIG. 3 is a plan view of an input sensor according to an embodiment of the present disclosure.
Figure 4:
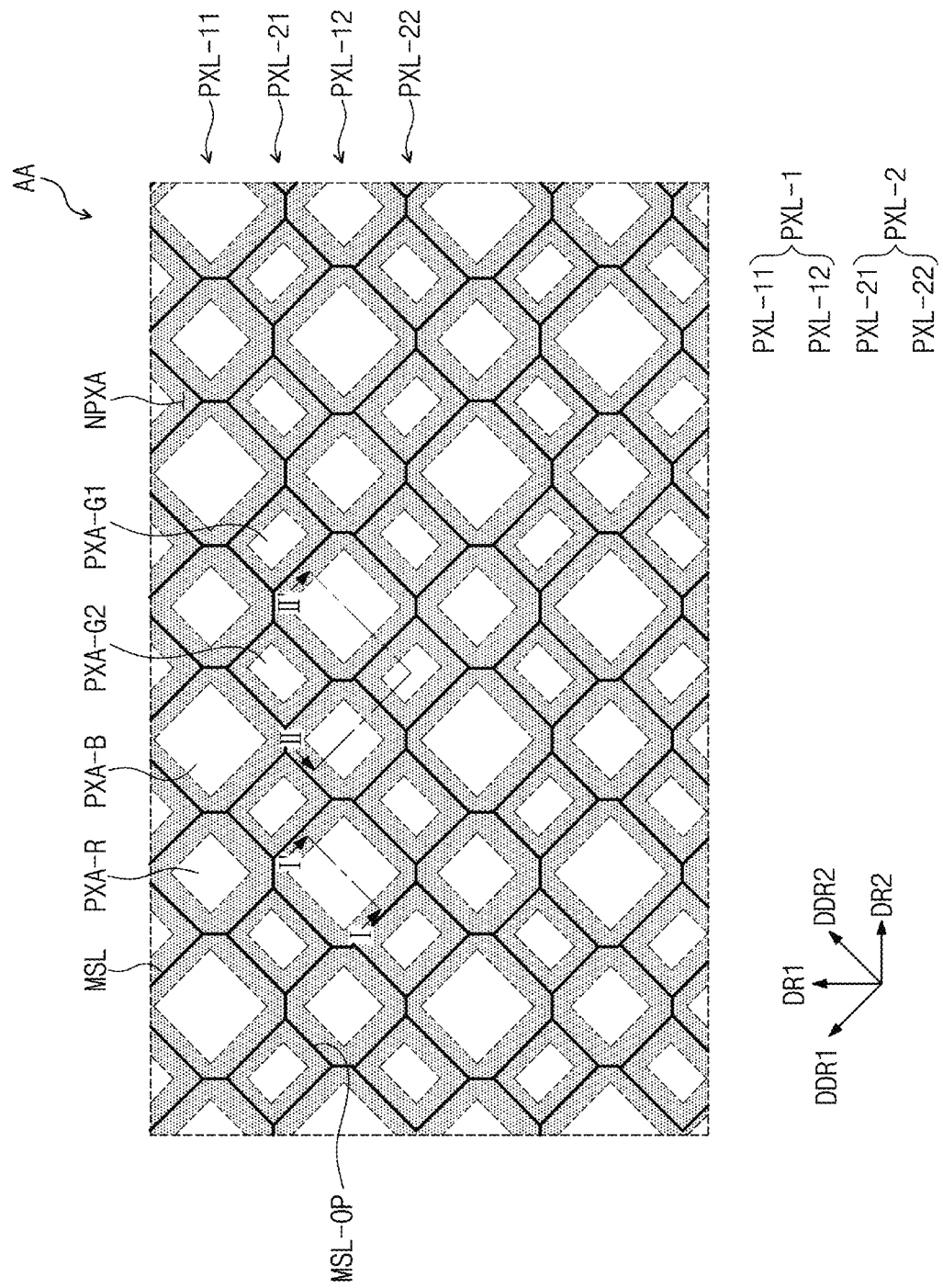
FIG. 4 is an enlarged plan view corresponding to a partial area of FIG. 3.

FIG. 3 is a plan view of an input sensor ISL according to an embodiment of the present disclosure. FIG. 4 is an enlarged plan view corresponding to a partial area of FIG. 3.

As shown in FIG. 3, the input sensor ISL includes a sensing area IS-DA, and a non-sensing area IS-NDA adjacent to the sensing area IS-DA. The sensing area IS-DA and the non-sensing area IS-NDA correspond to the display area DD-DA and the non-display area DD-NDA shown in FIG. 1A, respectively. The pixel area and the non-pixel area of the display panel DP (e.g., refer to FIG. 2) may correspond to or substantially correspond to (e.g., may overlap with or substantially overlap with) the sensing area IS-DA and the non-sensing area IS-NDA, respectively.

First electrodes E1-1 to E1-5 and second electrodes E2-1 to E2-4 are disposed to cross one another, and may be insulated from one another, at (e.g., in or on) the sensing area IS-DA. First signal lines electrically connected to the first electrodes E1-1 to E1-5 and second signal lines electrically connected to the second electrodes E2-1 to E2-4 are disposed at (e.g., in or on) the non-sensing area IS-NDA. One of the first signal lines or the second signal lines transmit a transmission signal for detecting an external input from an external circuit to the corresponding electrodes connected thereto, and another of the first signal lines or the second signal lines transmit a change in capacitance between the first electrodes E1-1 to E1-5 and the second electrodes E2-1 to E2-4 to the external circuit as a received signal.

Conductive mesh lines defining openings of the first electrodes E1-1 to E1-5 and the second electrodes E2-1 to E2-4 may be provided. The conductive mesh lines may be cut to form the first electrodes E1-1 to E1-5 having an integral shape. The conductive mesh lines may be cut to form sensing patterns SP of the second electrodes E2-1 to E2-4. The sensing patterns SP of the second electrodes E2-1 to E2-4 are disposed at (e.g., in or on) the same layer as those of the first electrodes E1-1 to E1-5, and may have the same or substantially the same stacked structure as each other.

Bridge patterns BR are disposed on a layer different from a layer forming the first electrodes E1-1 to E1-5. Each of the bridge patterns BR connects two adjacent sensing patterns SP in the first direction DR1 to each other. A corresponding sensing pattern SP and a corresponding bridge pattern BR are connected to each other through a contact hole TH penetrating an insulating layer disposed between the sensing patterns SP and the bridge patterns BR. FIG. 3 illustrates an example in which the input sensor ISL includes two bridge patterns BR that are disposed in each crossing region of the first electrodes E1-1 to E1-5 and the second electrodes E2-1 to E2-4, but the present disclosure is not limited thereto.

Referring to FIG. 4, a plurality of emission regions PXA-R, PXA-G1, PXA-G2, and PXA-B are disposed at (e.g., in or on) a pixel area. A peripheral region NPXA is disposed adjacent to the plurality of emission regions PXA-R, PXA-G1, PXA-G2, and PXA-B. The peripheral region NPXA defines (e.g., sets) a boundary between the plurality of emission regions PXA-R, PXA-G1, PXA-G2, and PXA-B. The plurality of emission regions PXA-R, PXA-G1, PXA-G2, and PXA-B may define a plurality of pixel rows PXL-1 and PXL-2 extending in the second direction DR2. In FIG. 3, the second direction DR2 is defined as an extension direction (or a row direction) of the pixel rows PXL-1 and PXL-2, and the first direction DR1 is defined as a column direction.

A mesh line MSL is disposed at (e.g., in or on) the peripheral region NPXA. The mesh line MSL defines a plurality of openings MSL-OP (hereinafter, referred to as "sensor openings") corresponding to (e.g., overlapping with) the plurality of emission regions PXA-R, PXA-G1, PXA-G2, and PXA-B.

In the present embodiment, the plurality of pixel rows PXL-1 and PXL-2 may be divided into two groups. The pixel rows PXL-1 of a first group includes a first color emission region PXA-R for generating a first color light, and a second color emission region PXA-B for generating a second color light. The first color emission region PXA-R and the second color emission region PXA-B are alternately disposed along the row direction DR2. The pixel rows PXL-1 of the first group may include a first pixel row PXL-11 and a second pixel row PXL-12. The first pixel rows PXL-11 and the second pixel rows PXL-12 may be alternately disposed along the column direction DR1.

An arrangement order of the first color emission regions PXA-R and the second color emission regions PXA-B is different in the first pixel row PXL-11 from the second pixel row PXL-12. In the column direction DR1, the first color emission region PXA-R of the first pixel row PXL-11 and the second color emission region PXA-B of the second pixel row PXL-12 may be aligned with each other (e.g., along one column), and the second color emission region PXA-B of the first pixel row PXL-11 and the first color emission region PXA-R of the second pixel row PXL-12 may be aligned with each other (e.g., along another column adjacent to the one column).

The pixel rows PXL-2 of the second group may include third color emission regions PXA-G1 and PXA-G2 for generating a third color light. The third color emission regions PXA-G1 and PXA-G2 may be divided into two types (e.g., two kinds) of emission regions having different shapes (e.g., different ornamental shapes or different shape orientations) from each other in a plan view. For example, a second type region PXA-G2 may have the same or substantially the same shape (e.g., the same or substantially the same ornamental shape) as that of a first type region PXA-G1, but rotated by 90° in a plan view. The shape of the first type region PXA-G1 may extend in a first crossing direction DDR1, and the shape of the second type region PXA-G2 may extend in a second crossing direction DDR2 that is perpendicular to or substantially perpendicular to the first crossing direction DDR1.

The first type regions PXA-G1 and the second type regions PXA-G2 are alternately disposed along the row direction DR2. The pixel rows PXL-2 of the second group may include a third pixel row PXL-21 and a fourth pixel row PXL-22. The third pixel rows PXL-21 and the fourth pixel rows PXL-22 may be alternately disposed along the column direction DR1.

An arrangement order of the first type regions PXA-G1 and the second type of regions PXA-G2 is different in the third pixel row PXL-21 from the fourth pixel row PXL-22. In the column direction DR1, the first type regions PXA-G1 of the third pixel row PXL-21 may be aligned with the second type regions PXA-G2 of the fourth pixel row PXL-22 (e.g., along one column), and the second type regions PXA-G2 of the third pixel row PXL-21 may be aligned with the first type regions PXA-G1 of the fourth pixel row PXL-22 (e.g., along another column adjacent to the one column). However, the present disclosure is not limited thereto, and the pixel rows PXL-2 of the second group may include only one type of emission regions having the same or substantially the same shape (e.g., the same or substantially the same ornamental shape and shape orientation) as each other in a plan view.

The pixel rows PXL-1 of the first group and the pixel rows PXL-2 of the second group may be alternately arranged along the column direction DR1. One of the third pixel row PXL-21 and the fourth pixel row PXL-22 is disposed between the first pixel row PXL-11 and second pixel row PXL-12 that are successive (e.g., that are adjacent to each other), and another of the third pixel row PXL-21 and the fourth pixel row PXL-22 is disposed between the second pixel row PXL-12 and another first pixel row PXL-11 that is adjacent to (e.g., that is next to) the second pixel row PXL-12.

In the present embodiment, the first color emission region PXA-R, the second color emission region PXA-B, and the third color emission regions PXA-G1 and PXA-G2 having different areas from each other are illustrated as an example, but the present disclosure is not limited thereto. As an example, FIG. 4 shows that, from among the emission regions, the area of the second color emission region PXA-B may be the largest, and the area of each of the third color emission regions PXA-G1 and PXA-G2 may be the smallest, but the present disclosure is not limited thereto.

In the present embodiment, the first color emission region PXA-R may generate red light, the second color emission region PXA-B may generate blue light, and the third color emission regions PXA-G1 and PXA-G2 may generate green light. However, the present disclosure is not limited thereto. The color of the lights emitted by the first color emission region PXA-R, the second color emission region PXA-B, and the third color emission regions PXA-G1 and PXA-G2 may be selected as a combination of three color lights that are capable of being mixed with each other to generate white colored light (e.g., white light).

Each of the first color emission region PXA-R, the second color emission region PXA-B, and the third color emission regions PXA-G1 and PXA-G2 may have a shape of a suitable polygon in a plan view having an internal angle of 90° or more. The internal angles may be the same or substantially the same size as each other.

According to the present embodiment, when viewed in a plan view, the first color emission region PXA-R and the second color emission region PXA-B may have a square shape, and the third color emission regions PXA-G1 and PXA-G2 may have a rectangular shape. However, the present disclosure is not limited thereto. For example, one of the first color emission region PXA-R, the second color emission region PXA-B, and the third color emission regions PXA-G1 and PXA-G2 may have a hexagonal shape or an octagonal shape.

Figure 5:
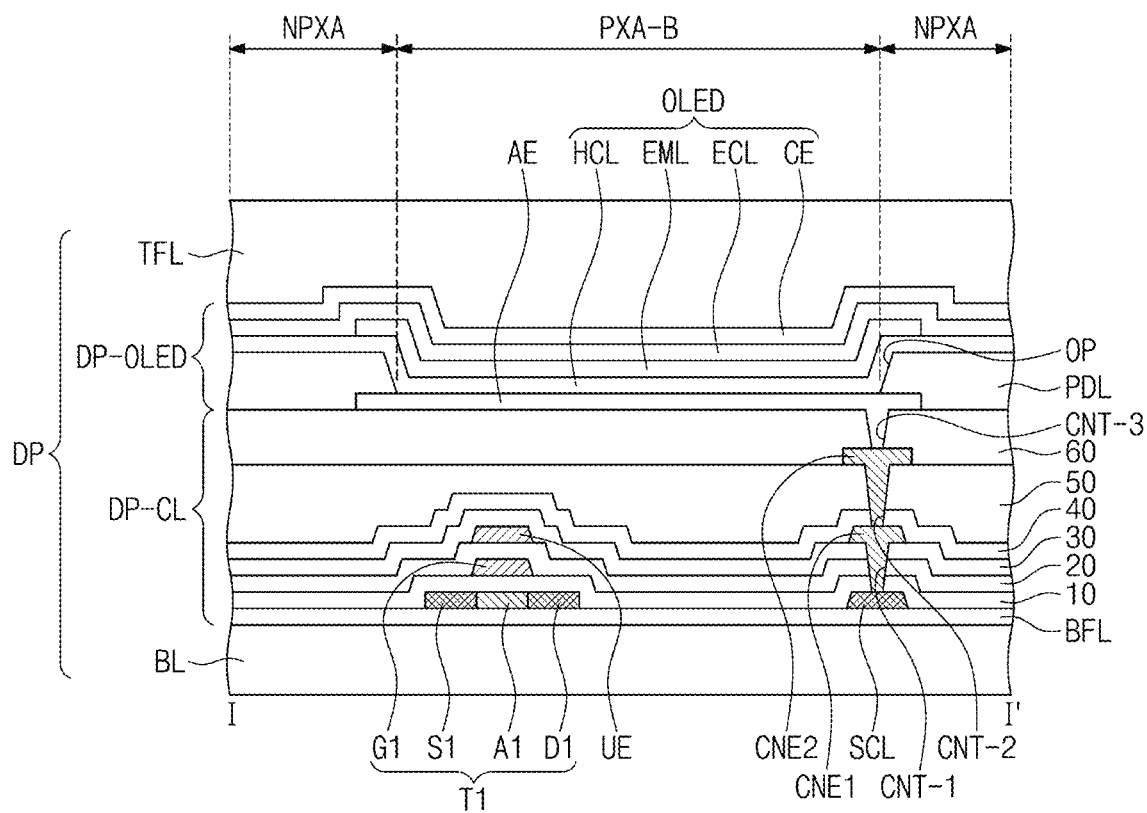
FIG. 5 is a cross-sectional view of a display panel taken along the line I-I' of FIG. 4.
Figure 6:
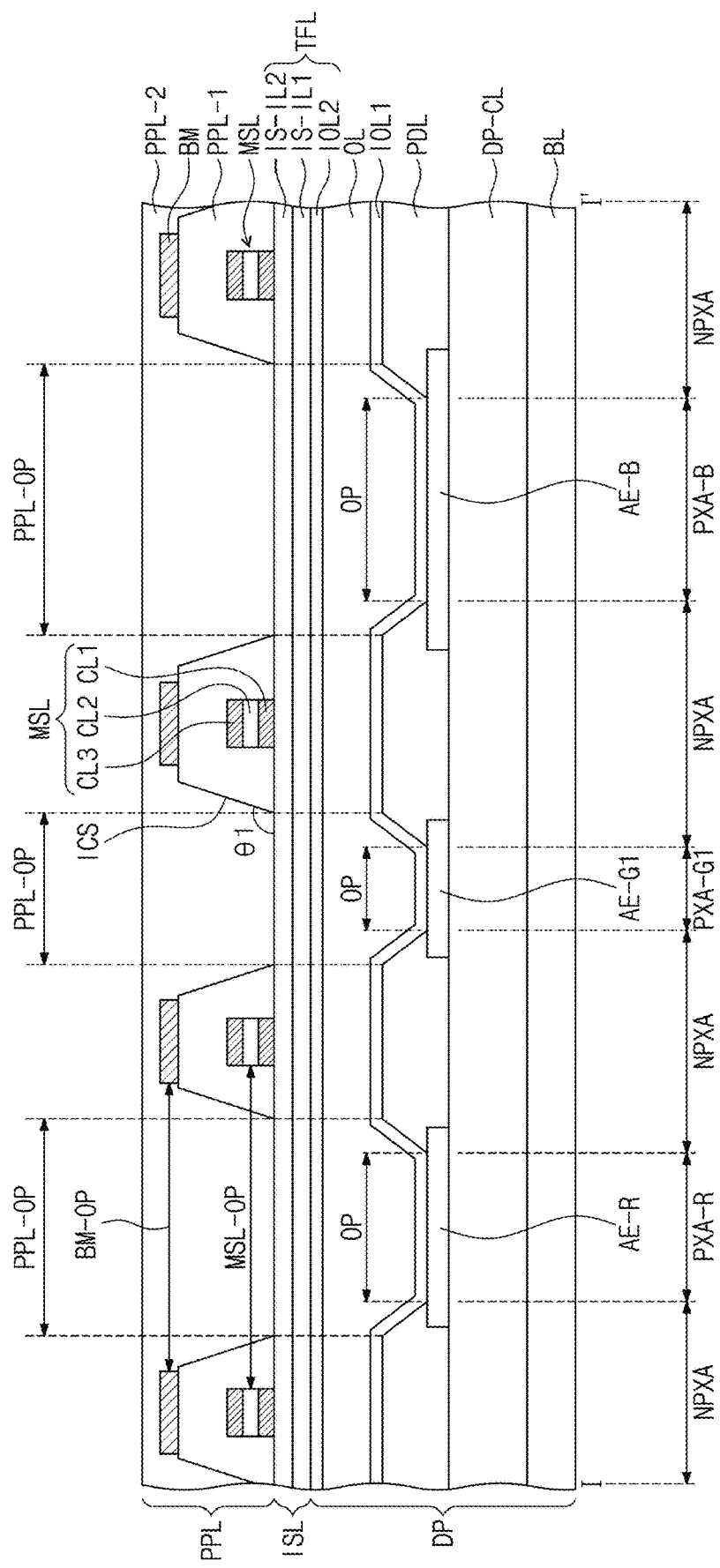
FIG. 6 is a cross-sectional view of a display device taken along the line II-II' of FIG. 4.

FIG. 5 is a cross-sectional view of a display panel taken along the line I-I' of FIG. 4. FIG. 6 is a cross-sectional view of a display device taken along the line II-11' of FIG. 4.

FIG. 5 is illustrated based on the second color emission region PXA-B, but the emission regions PXA-R, PXA-G1, PXA-G2, and PXA-B shown in FIG. 4 may have the same or substantially the same stacked structure as that shown in FIG. 5 when viewed in a cross-section. Accordingly, the description hereinafter with reference to FIG. 5 may refer to the second color emission region PXA-B simply as the emission region PXA.

The display panel DP may include a base layer BL, a circuit element layer DP-CL, a display element layer DP-OLED, and an upper insulating layer TFL. The stacked structure of the display panel DP is not particularly limited thereto.

Referring to FIG. 5, the display panel DP may include a plurality of insulating layers, a semiconductor pattern, a conductive pattern, and a signal line. An insulating layer, a semiconductor layer, and a conductive layer are formed by a suitable method, for example, such as coating or vapor deposition. Thereafter, the insulating layer, the semiconductor layer, and the conductive layer may be selectively patterned by photolithography and etching. In this way, the semiconductor pattern, the conductive pattern, the signal line, and the like included in the circuit element layer DP-CL and the display element layer DP-OLED may be formed.

The base layer BL may include a synthetic resin film. The base layer BL may include a glass substrate, a metal substrate, or an organic/inorganic composite material substrate.

At least one inorganic layer is disposed on the upper surface of the base layer BL. For example, a buffer layer BFL that improves a bonding force between the base layer BL and the semiconductor pattern may be disposed on the base layer BL. The buffer layer BFL may include a silicon oxide layer and a silicon nitride layer. The silicon oxide layer and the silicon nitride layer may be alternately stacked.

The semiconductor pattern is disposed on the buffer layer BFL. The semiconductor pattern may include polysilicon. However, the present disclosure is not limited thereto, and the semiconductor pattern may include amorphous silicon or a metal oxide.

FIG. 5 illustrates some semiconductor patterns, and the semiconductor patterns may be further disposed to correspond to the plurality of emission regions PXA-R, PXA-G1, PXA-G2, and PXA-B (e.g., refer to FIG. 4) in a plan view. The semiconductor pattern may be arranged in a suitable rule (e.g., a predetermined or a specific rule) throughout the plurality of emission regions PXA-R, PXA-G1, PXA-G2, and PXA-B (e.g., refer to FIG. 4). The semiconductor pattern has different electrical properties depending on whether or not it is doped. The semiconductor pattern may include a first region having a high doping concentration, and a second region having a low doping concentration. The first region may be doped with an N-type dopant or a P-type dopant. For example, a P-type transistor includes the first region that is doped with the P-type dopant.

The first region has a higher conductivity than that of the second region, and may serve or substantially serve as an electrode or a signal line. The second region may correspond to or substantially correspond to an active or channel (e.g., an active area or a channel area) of the resulting transistor. In other words, one part of the semiconductor pattern may be the active or the channel of the transistor, another part thereof may be a source or a drain of the transistor, and another part thereof may be a conductive region.

As shown in FIG. 5, a source S1, an active A1, and a drain D1 of a transistor T1 are formed from the semiconductor pattern. FIG. 5 illustrates a part of a signal transmission region SCL formed from the semiconductor pattern. The signal transmission region SCL may be connected to the drain D1 of the transistor T1 in a plan view.

First to sixth insulating layers 10, 20, 30, 40, 50, and 60 are disposed on the buffer layer BFL. Each of the first to sixth insulating layers 10, 20, 30, 40, 50, and 60 may be an inorganic layer or an organic layer. A gate G1 of the transistor T1 may be disposed on the first insulating layer 10. An upper electrode UE may be disposed on the second insulating layer 20. A first connection electrode CNE1 may be disposed on the third insulating layer 30. The first connection electrode CNE1 may be connected to the signal transmission region SCL through a contact hole CNT-1 penetrating the first to third insulating layers 10, 20, and 30.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A light emitting element OLED is disposed on the sixth insulating layer 60. A first electrode AE is disposed on the sixth insulating layer 60. The first electrode AE is connected to the second connection electrode CNE2 through a contact hole CNT-3 penetrating through the sixth insulating layer 60. An opening OP (hereinafter, referred to as an "emission opening") is defined in a pixel defining layer PDL. The emission opening OP exposes at least a part of the first electrode AE. The emission region PXA may be defined to correspond to or substantially correspond to a partial region of the first electrode AE that is exposed by the emission opening OP. In other words, the emission region PXA is defined by an edge of the pixel defining layer PDL that is in contact with the first electrode AE.

A hole control layer HCL may be disposed throughout the emission region PXA and the peripheral region NPXA. The hole control layer HCL may include a hole transport layer, and may further include a hole injection layer. An emission layer EML is disposed on the hole control layer HCL. The emission layer EML may be disposed in a region corresponding to the emission opening OP. In other words, the emission layer EML may be formed separately for each of the emission regions PXA-R, PXA-G1, PXA-G2, and PXA-B.

An electron control layer ECL is disposed on the emission layer EML. The electron control layer ECL may include an electron transport layer, and may further include an electron injection layer. A second electrode CE is disposed on the electron control layer ECL.

The upper insulating layer TFL is disposed on the second electrode CE. The upper insulating layer TFL may include a plurality of thin films. In an embodiment of the present disclosure, the upper insulating layer TFL may include a capping layer, and a thin encapsulation layer disposed on the capping layer.

Referring to FIG. 6, first electrodes AE-R, AE-B, and AE-G1 corresponding to the first color emission region PXA-R, the second color emission region PXA-B, and the third color emission region PXA-G1, respectively, are disposed on the circuit element layer DP-CL. In FIG. 6, a partial configuration of the light emitting element is illustrated for convenience, and a detailed structure of the light emitting element may be the same or substantially the same as the light emitting element OLED described above with reference to FIG. 5.

The emission openings OP of the pixel defining layer PDL corresponding to the first color emission region PXA-R, the second color emission region PXA-B, and the third color emission region PXA-G1, respectively, are defined in the pixel defining layer PDL. In the present embodiment, some regions of the first electrodes AE-R, AE-B, and AE-G1 exposed by the emission openings OP are defined as the first color emission region PXA-R, the second color emission region PXA-B, and the third color emission region PXA-G1, respectively.

The upper insulating layer TFL may include a first encapsulation inorganic layer IOL1, an organic layer OL, and a second encapsulation inorganic layer IOL2. This three-layered structure may be defined as the thin encapsulation layer.

The input sensor ISL may be directly disposed on the upper insulating layer TFL. The input sensor ISL may include at least one insulating layer IS-IL1 and IS-IL2, and the mesh line MSL. The at least one insulating layers IS-IL1 and IS-IL2 of the input sensor ISL may include at least one inorganic layer. For example, the at least one insulating layers IS-IL1 and IS-IL2 may include a first insulating layer IS-IL1 and a second insulating layer IS-IL2. In an embodiment, each of the first and second insulating layers IS-IL1 and IS-IL2 may be an inorganic layer. In an embodiment of the present disclosure, the second insulating layer IS-IL2 may be an organic layer, or an additional organic layer may be further disposed on the second insulating layer IS-IL2. However, the present disclosure is not limited thereto.

The mesh line MSL may be directly disposed on the second insulating layer IS-IL2. In some embodiments, the bridge pattern BR (e.g., refer to FIG. 3) may be disposed between the first insulating layer IS-IL1 and the second insulating layer IS-IL2. In an embodiment of the present disclosure, the input sensor ISL may further include an inorganic layer directly covering the mesh line MSL.

The mesh line MSL may have a multilayered structure. The mesh line MSL may include a first layer CL1, a second layer CL2, and a third layer CL3. The first layer CL1 may have a higher bonding rate to the insulating layer (e.g., to the second insulating layer IS-IL2) than that of the second layer CL2, the second layer CL2 may have a higher conductivity than those of the first and third layers CL1 and CL3, and the third layer CL3 may have a lower reflectance of external light than that of the second layer CL2. For example, the mesh line MSL may have a multilayered structure in which titanium/aluminum/titanium are stacked in the described order.

However, the present disclosure is not limited thereto, and the multilayered conductive layer (e.g., the mesh line MSL) may include at least two from among various suitable transparent conductive layers and metal layers. The multilayered conductive layer (e.g., the mesh line MSL) may include one or more various different metal layers including different metals from each other. The transparent conductive layer may include indium tin oxide (ITO), indium zinc oxide (IZO), zinc oxide (ZnO), indium tin zinc oxide (ITZO), PEDOT, metal nanowires, and/or graphene. The metal layer may include molybdenum, silver, titanium, copper, aluminum, and/or any suitable alloys thereof.

In an embodiment of the present disclosure, the mesh line MSL may be omitted. In an embodiment of the present disclosure, a separately manufactured input sensor ISL may be attached on the display panel DP or the optical control layer PPL. In this case, all of the first and second insulating layers IS-IL1 and IS-IL2 disposed between the display panel DP and the optical control layer PPL may be omitted, or at least one thereof may remain.

As shown in FIG. 6, the optical control layer PPL may be directly disposed on the input sensor ISL. The optical control layer PPL may include an organic layer PPL-1, a light blocking pattern BM, and a planarization layer PPL-2. In an embodiment of the present disclosure, the planarization layer PPL-2 may be omitted, and an adhesive layer PSA for bonding the window WP (e.g., refer to FIG. 2) may replace the planarization layer PPL-2.

The organic layer PPL-1 may cover the mesh line MSL. Openings PPL-OP corresponding to the emission regions PXA-R, PXA-G1, and PXA-B, respectively, are defined in the organic layer PPL-1. The organic layer PPL-1 may include an acrylate-based resin, an epoxide-based resin, a siloxane-based resin, a polyimide-based resin, or a suitable mixture thereof. The organic layer PPL-1 may include particles having a low refractive index. For example, the organic layer PPL-1 may include hollow silica particles.

As illustrated in FIG. 6, the organic layer PPL-1 may include an inclined surface ICS defining the opening PPL-OP. An angle $\ominus 1$ formed between the inclined surface ICS and an upper surface of the second insulating layer IS-IL2 exposed by the opening PPL-OP may have an obtuse angle. For example, the angle $\ominus 1$ may be in a range of 91° to 135°.

The light blocking pattern BM is disposed on the organic layer PPL-1, and light blocking openings BM-OP are defined in the light blocking pattern BM. The light blocking pattern BM is a pattern having a black color, and may include a black coloring agent. The black coloring agent may include a black dye and a black pigment. The black coloring agent may include carbon black, a metal such as chromium, or an oxide thereof. A material used in a process of patterning the light blocking pattern BM (e.g., KOH, which is a component of a developer) may react with the mesh line MSL (e.g., which may include aluminum), and thus, the organic layer PPL-1 may serve as a barrier layer to prevent or substantially prevent such reaction.

Color filters may be disposed to correspond to (e.g., disposed in or to overlap with) the light blocking openings BM-OP. The color filters may constitute (e.g., may be included in) the optical control layer PPL, or may be disposed below or above the optical control layer PPL.

The planarization layer PPL-2 fills the opening PPL-OP. The planarization layer PPL-2 may have a greater refractive index than that of the organic layer PPL-1. The planarization layer PPL-2 may have a refractive index greater than that of the organic layer PPL-1 by about 0.5 or more. For example, the refractive index of the organic layer PPL-1 may be 1.4 to 1.6, and the refractive index of the planarization layer PPL-2 may be 1.6 to 1.9.

The planarization layer PPL-2 may include an acrylate-based resin, an epoxide-based resin, a siloxane-based resin, a polyimide-based resin, a zirconium and hafnium acrylates-based resin, brominated aromatic acrylate-based resin, or a suitable mixture thereof. The planarization layer PPL-2 may include particles having a high refractive index. The particles having the high refractive index may include (e.g., may be) Zirconia ($ZrO_2$), Titania ($TiO_2$), Silica ($SiO_2$), or a suitable mixture thereof. A diameter of a particle may be 100 nm or less.

The source light generated from the light emitting element may be reflected from the inclined surface ICS, and then may be provided in a vertical direction, thereby improving condensing efficiency. Total reflection may be guided by a difference in the refractive indices between the planarization layer PPL-2 and the organic layer PPL-1, thereby improving light condensing efficiency. The light blocking pattern BM may prevent or substantially prevent color mixing of adjacent pixels.

Figure 7A:
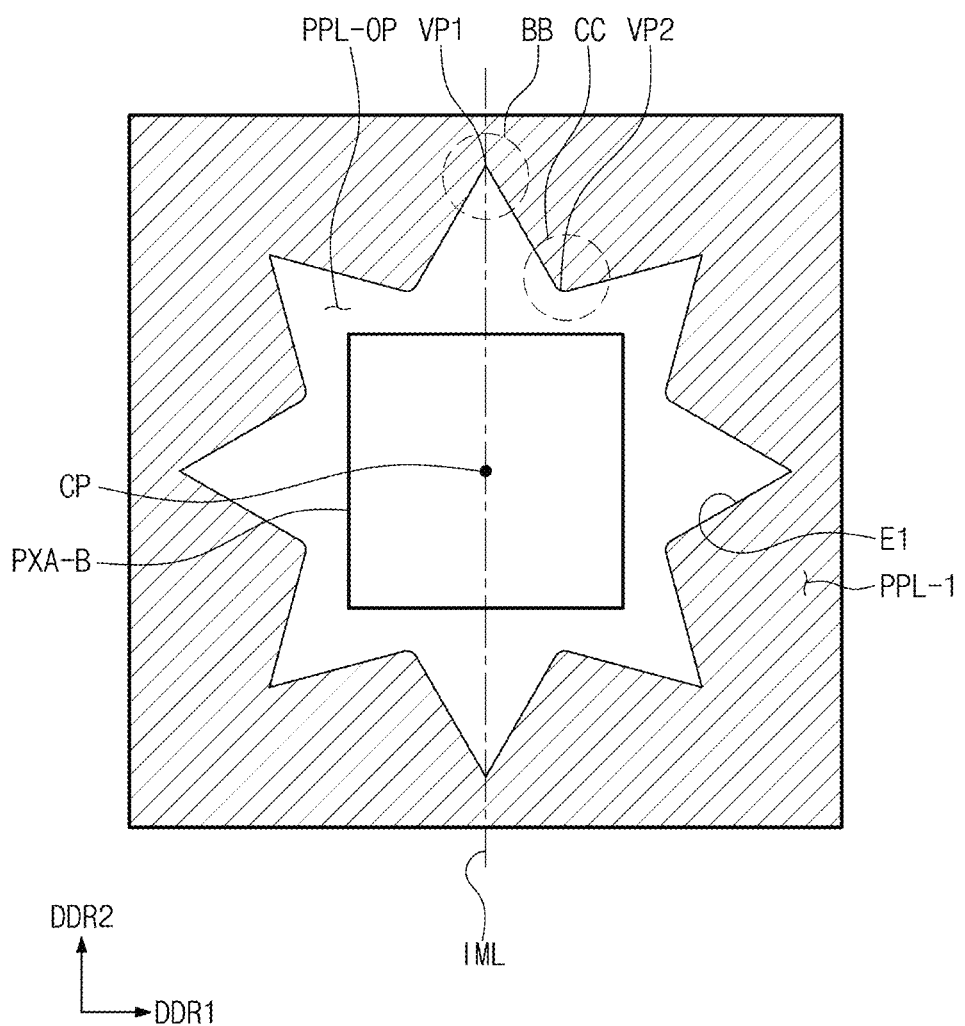
FIG. 7A is an enlarged plan view of an opening of an organic layer of an optical control layer according to an embodiment of the present disclosure.
Figure 7B:
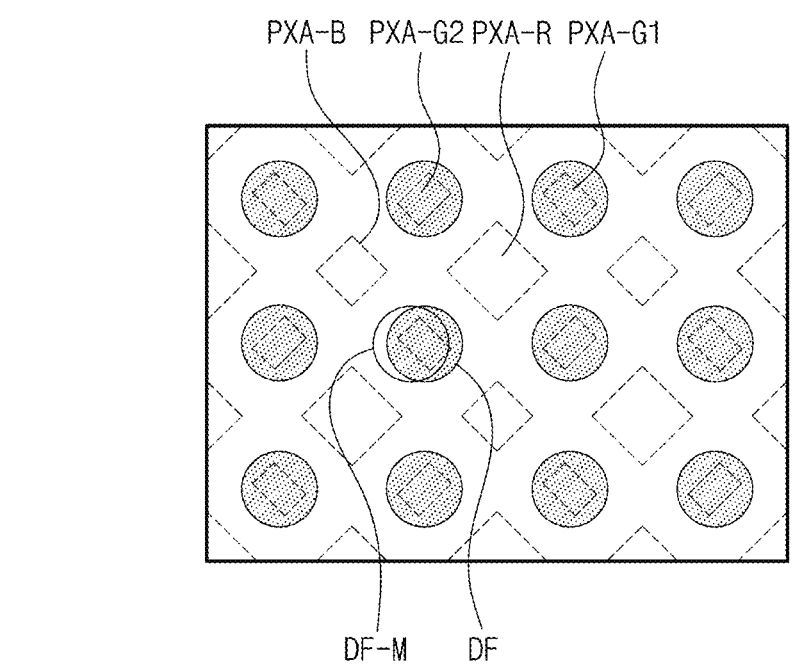
FIG. 7B is a plan view illustrating a process in a method of manufacturing a display device according to an embodiment of the present disclosure.
Figure 7C:
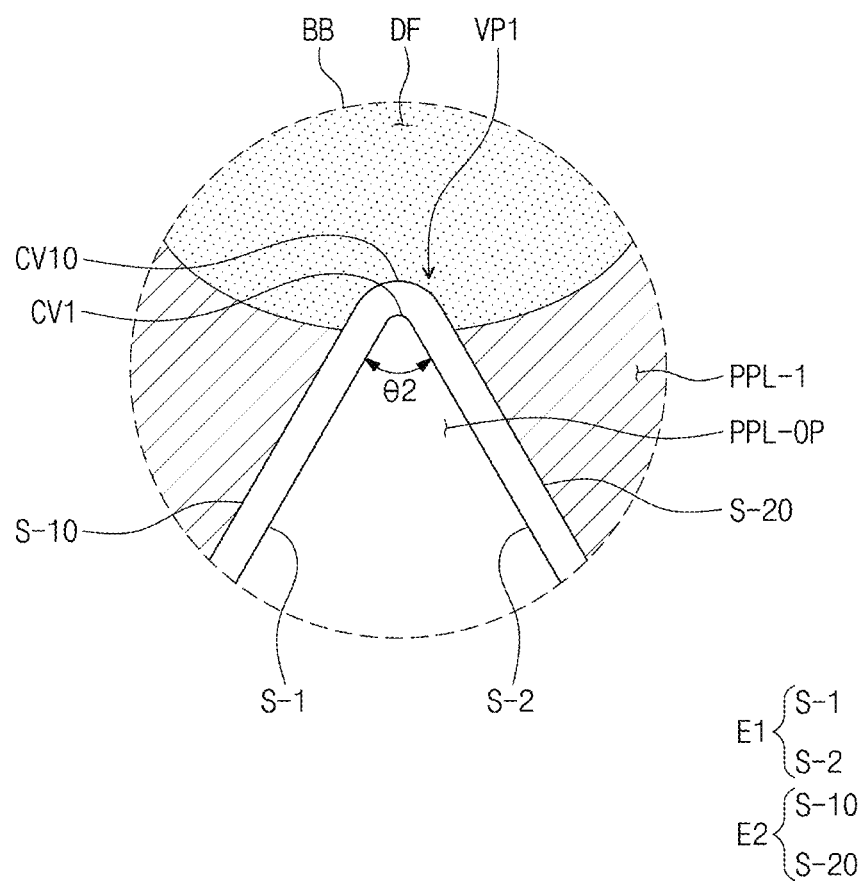
FIG. 7C is an enlarged plan view of a first vertex region of FIG. 7A.
Figure 7D:
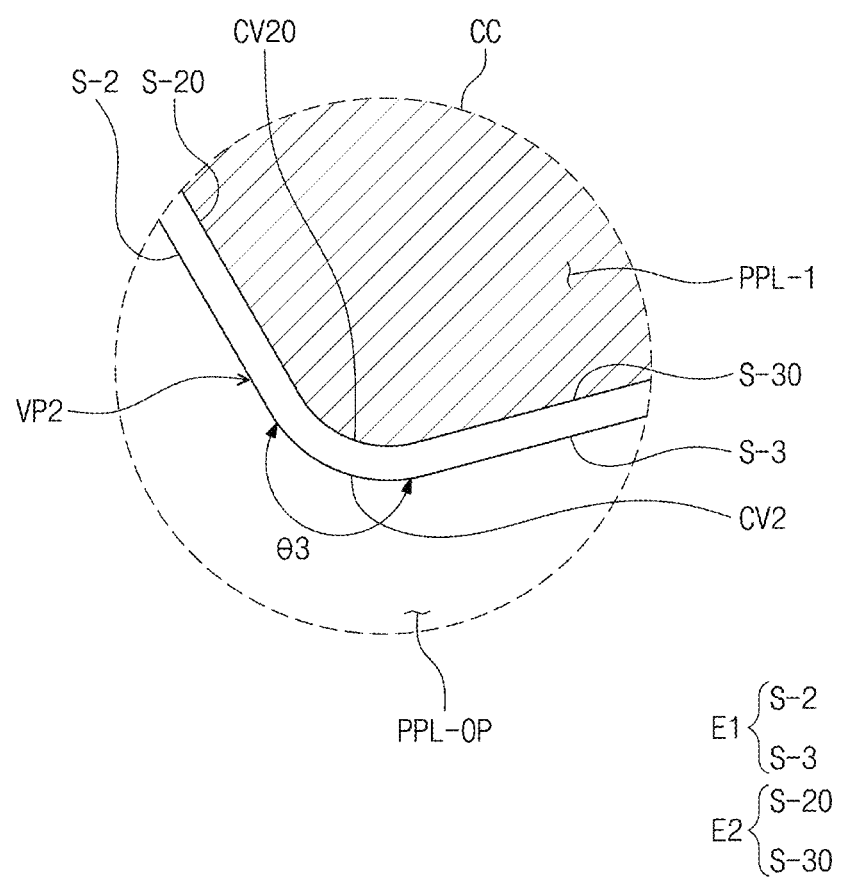
FIG. 7D is an enlarged plan view of a second vertex region of FIG. 7A.

FIG. 7A is an enlarged plan view of the opening PPL-OP of the organic layer PPL-1 of the optical control layer PPL according to an embodiment of the present disclosure. FIG. 7B is a plan view illustrating a process in a method of manufacturing a display device according to an embodiment of the present disclosure. FIG. 7C is an enlarged plan view of a first vertex region BB of FIG. 7A. FIG. 7D is an enlarged plan view of a second vertex region CC of FIG. 7A.

Hereinafter the second color emission region PXA-B and the corresponding opening PPL-OP is described in more detail with reference to FIG. 7A, but the different color emission regions PXA-R, PXA-G1, and PXA-G2 and the corresponding openings may have the same or substantially the same structure as that of the second color emission region PXA-B and the corresponding opening PPL-OP shown in FIG. 7A, and thus, redundant description thereof may not be repeated. In FIG. 7A, an edge E1 (hereinafter, referred to as a "first edge") of the opening PPL-OP may correspond to a partial region of the second insulating layer IS-IL2 or a lower side of the inclined surface ICS that are exposed by the opening PPL-OP (e.g., see FIG. 6).

In FIGS. 7C and 7D, a second edge E2 disposed outside the first edge E1 is additionally shown to indicate a boundary between the inclined surface ICS and the upper surface of the organic layer PPL-1. The first edge E1 and the second edge E2 include a plurality of sides defining a plurality of vertices. In other words, each of the plurality of sides connects two adjacent vertices (e.g., two closest vertices) to each other from among the plurality of vertices.

As shown in FIG. 7A, the opening PPL-OP has a larger area than that of the emission region PXA-B corresponding thereto, and the emission region PXA-B is disposed within (e.g., inside) the opening PPL-OP. When the emission region PXA-B is larger than the opening PPL-OP, or the emission region PXA-B is disposed outside the opening PPL-OP, the light condensing efficiency described above with reference to FIG. 6 may be reduced.

The opening PPL-OP includes first vertices VP1 and second vertices VP2 that are spaced from each other in a plan view. FIG. 7A illustrates an asterisk-shaped opening PPL-OP including eight first vertices VP1 and eight second vertices VP2. Each of the first vertices VP1 may have an internal angle of 90° or less. Each of the second vertices VP2 may have an internal angle greater than 90° and less than 270°.

Each of the first vertices VP1 is disposed to be farther from a center CP of the opening PPL-OP than a corresponding second vertex VP2 adjacent to (e.g., closest to) the corresponding first vertex VP1 from among the second vertices VP2. Thus, a fluid composition provided on the upper surface of the organic layer PPL-1 may be guided to flow easily into the opening PPL-OP when the planarization layer PPL-2 (e.g., see FIG. 6) is formed.

FIG. 7B shows fluid composition droplets DF provided in an inkjet manner on the upper surface of the organic layer PPL-1. The fluid composition droplets DF that are provided to overlap with the emission regions PXA-G1 and PXA-G2 of the third color are illustrated as an example. Generally, it may be desirable to provide an equal or substantially equal interval between the fluid composition droplets DF in the first direction DR1 and the second direction DR2. However, the fluid composition droplets DF may not be provided at equal or substantially equal intervals due to an error occurring during an operation of a manufacturing facility. In this case, a defect in which an opening PPL-OP that is disposed far from the fluid composition droplet DF is not completely filled may occur. In addition, even when the fluid composition droplets DF are provided at equal or substantially equal intervals, a defect in which some of the openings PPL-OP are not completely filled due to a process error may occur, and thus, it may be desirable to guide the fluid composition droplets DF to flow smoothly through the openings PPL-OP.

According to the present embodiment, as described in more detail below with reference to FIGS. 7B and 7C, the openings PPL-OP including the first vertices VP1 may allow the flow of the fluid composition droplets DF to be guided into the openings PPL-OP.

The center CP of the opening PPL-OP may correspond to a location of a center of gravity of the shape defined by the opening PPL-OP in a plan view. The center CP of the opening PPL-OP may be at an intersection point (e.g., a crossing point) of diagonal lines of the polygon shape defined by the opening PPL-OP in the plan view. The center CP of the opening PPL-OP may be the same or substantially the same as a center of the second color emission region PXA-B.

As shown in FIGS. 7C and 7D, when the first vertex region BB and the second vertex region CC are enlarged, the first vertex VP1 and the second vertex VP2 may be different from a vertex in the mathematical sense. The opening PPL-OP may be formed by removing a part of the organic layer PPL-1 by a photolithography process and an etching process. In this case, due to limitations of a process accuracy, for example, the first vertex VP1 and the second vertex VP2 may be curved.

In other words, a first curve CV1 is disposed between a first side S-1 and a second side S-2 constituting the first edge E1 (e.g., at the first vertex VP1), and a second curve CV2 is disposed between the second side S-2 and a third side S-3 constituting the first edge E1 (e.g., at the second vertex VP2 adjacent to the first vertex VP1). A first curve CV10 is disposed between a first side S-10 and a second side S-20 constituting the second edge E2 (e.g., at the first vertex VP1), and a second curve CV20 is disposed between the second side S-20 and a third side S-30 constituting the second edge E2 (e.g., at the second vertex VP2 adjacent to the first vertex VP1).

Referring to FIG. 7C, a force at which the fluid composition droplets DF provided on an upper surface spread out is determined by a capillary pressure. The larger the capillary pressure, the better that the fluid composition droplets spread out and flow into the opening PPL-OP. As a result, the fluid composition may more easily fill the opening PPL-OP.

The capillary pressure Pc may be determined according to Equation 1 below. Equation 1

$$Pc = Pnon-wettingphase - Pwettingphase = \text{Pair} - \text{Pfluid} = \left(\frac{1}{Rx} + \frac{1}{Ry}\right)$$

In Equation 1, "y" may refer to a surface tension, "Rx" may refer to an interfacial curvature radius in a plane direction, and "Ry" may refer to an interfacial curvature radius in a thickness direction.

As illustrated in FIG. 7C, when the first vertex VP1 has an angle $\ominus 2$ of an acute angle, the radius of curvature of the first curve CV1 is relatively small. The radius of curvature of the second curve CV10 is proportional to the radius of curvature of the first curve CV1. The interfacial curvature radius Rx of the fluid composition droplet DF that is in contact with the second curve CV10 in the plane direction with respect to the second curve CV10 is relatively small. As a result, the capillary pressure Pc of the fluid composition droplet DF adjacent to the first vertex VP1 is increased.

As an internal angle $\ominus 2$ of the first vertex VP1 decreases, the capillary pressure Pc increases. A square or a rectangle has an internal angle of 90°, and as the number of sides of a regular polygon increases, the internal angle $\ominus 2$ thereof increases. In this case, the capillary pressure Pc may be relatively reduced.

As shown in FIG. 7A, the opening PPL-OP having the shape different from that of the second color emission region PXA-B having a square shape (or a rectangle shape) may be formed, thereby forming the opening PPL-OP having the internal angle $\ominus 2$ of 90° or less.

Referring to FIGS. 7A and 7D, each of the second vertices VP2 may have an internal angle ⊖3 that is greater than 90°. The internal angle ⊖3 may be 270° or less. In the present embodiment, the internal angle ⊖3 of about 120° is illustrated as an example.

As shown in FIG. 7B, when viewed in a plan view, four adjacent fluid composition droplets DF relative to (e.g., based on) one opening PPL-OP are disposed. Even when one fluid composition drop DF-M of the four fluid composition droplets DF is provided farther than a design value, it may be desirable for the number of the first vertices VP1 to be greater than or equal to "m" (where "m" is a natural number of 4 or more) to allow the fluid composition drop DF-M that is provided farther than the design value to be guided to the opening PPL-OP.

As shown in FIG. 7B, the one fluid composition drop DF-M is provided on a left side of the fluid composition droplets DF of the design value. A probability that the one fluid composition drop DF-M flows into the opening PPL-OP corresponding to the first color emission region PXA-R disposed on a right/upper side of the one fluid composition drop DF-M is relatively low. Thus, a defect in which the fluid composition drop DF-M does not sufficiently flow into the openings PPL-OP corresponding to the first color emission region PXA-R may occur.

However, according to one or more embodiments of the present disclosure, the opening PPL-OP corresponding to the first color emission region PXA-R disposed on the right/upper side of the one fluid composition drop DF-M may have the above-described shape having the first vertex VP1, thereby increasing the probability that the fluid composition flows into the opening PPL-OP. Although the four or more first vertices VP1 are provided to be shifted in one of a horizontal direction or a vertical direction, a probability of introducing the fluid composition into the opening PPL-OP may be increased. Each of the second vertices VP2 is disposed between two corresponding adjacent first vertices from among the first vertices VP1. To define a symmetrical opening PPL-OP, the number of second vertices VP2 may be greater than or equal to m–2. In addition, each of the first vertices VP1 and the second vertices VP2 may be provided in an even number.

As shown in FIG. 7A, when the first vertices VP1 and the second vertices VP2 are provided in the same number as each other, and are provided in even numbers of 4 or more, the opening PPL-OP may be provided to be symmetrical or substantially symmetrical relative to (e.g., based on) a virtual line IML passing through the center CP of the opening PPL-OP. Because the opening PPL-OP may have the symmetrical or substantially symmetrical shape, the flow of the fluid composition droplets DF, which may be randomly and/or irregularly provided, may be smoothly guided to the inside of the opening PPL-OP.

FIGS. 8A to 8J are enlarged plan views of the opening PPL-OP of the organic layer PPL-1 according to one or more embodiments of the present disclosure.

Figure 8A:
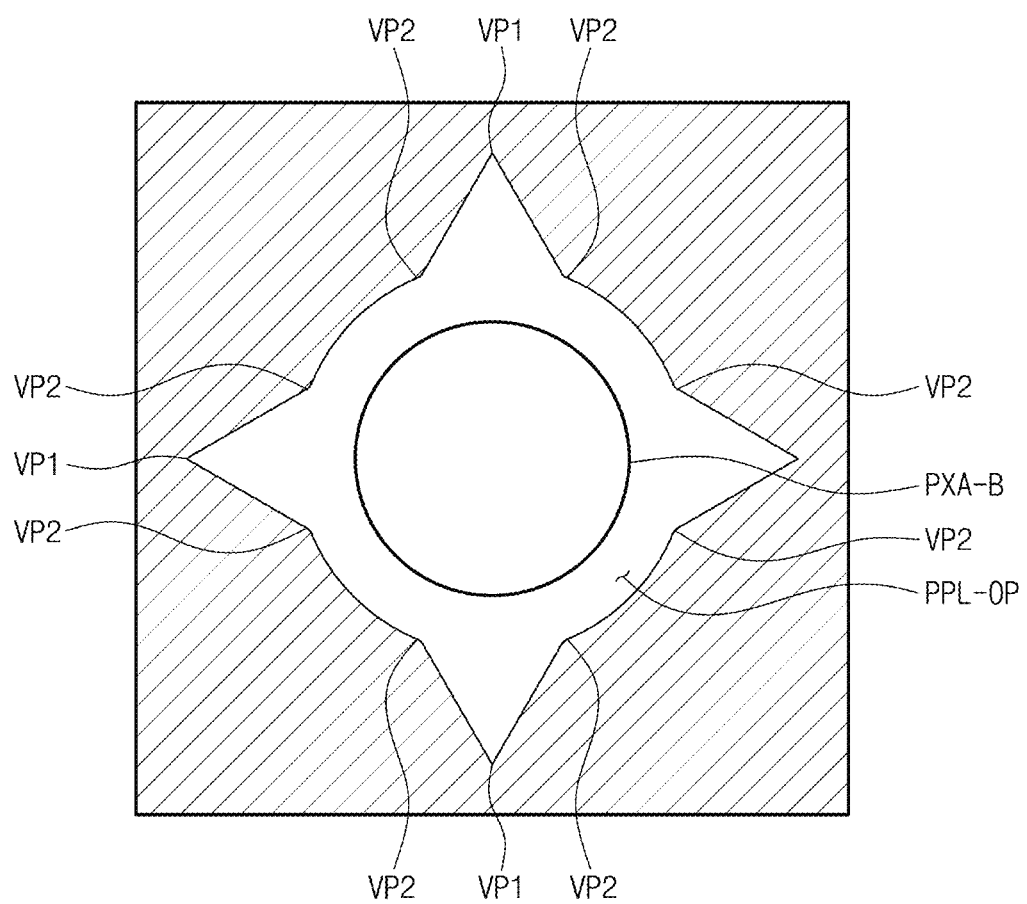
FIGS. 8A-8J are enlarged plan views of an opening of an organic layer according to one or more embodiments of the present disclosure.

FIG. 8A illustrates an example of a circular emission region PXA-B. An example of the opening PPL-OP is illustrated as including four first vertices VP1 and eight second vertices VP2. A side defined by a straight line is disposed between the first vertex VP1 and second vertex VP2, which are adjacent to each other, and a side defined by a curved line is disposed between the second vertex VP2 and an adjacent second vertex VP2. To measure internal angles of the second vertices VP2, a tangent line adjacent to a corresponding second vertex VP2 may be used. The four first vertices VP1 may allow the flow of the fluid composition droplets DF, which may be randomly and/or irregularly provided, to be smoothly guided to the inside of the opening PPL-OP.

Figure 8B:
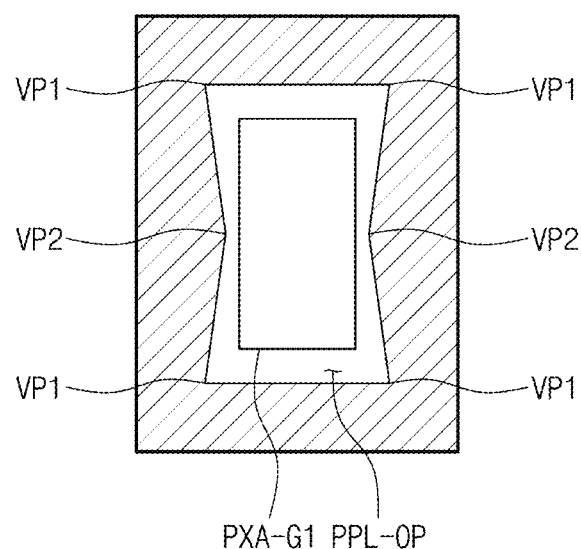

FIG. 8B illustrates an example of a rectangular emission region PXA-G1. The opening PPL-OP is illustrated as including four first vertices VP1 and two second vertices VP2. A side defined by a straight line is disposed between the first vertex VP1 and an adjacent first vertex VP1, and a side defined by a straight line is disposed between the first vertex VP1 and an adjacent second vertex VP2.

According to the present embodiment, the conditions described above with reference to FIG. 7A may be equally or substantially equally satisfied. To satisfy the conditions described above with reference to FIG. 7A, the opening PPL-OP may include at least six vertices.

To satisfy the conditions described above with reference to FIG. 7A, the opening PPL-OP may have a polygonal shape in a plan view, and the number of sides in the polygonal shape may be equal to "n" (where "n" is a natural number of 6 or more). It may be desirable for the polygon defined by the opening PPL-OP to have a greater number of vertices than that of a polygon defined by the emission region PXA-G1, to allow the opening PPL-OP to have the first vertex VP1 having the acute angle ⊖2, and to sufficiently cover the emission region PXA-G1 in a narrow area.

Figure 8C:
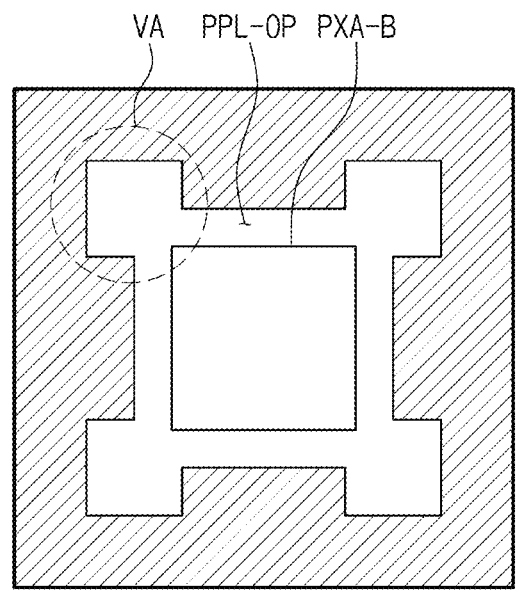
Figure 8D:
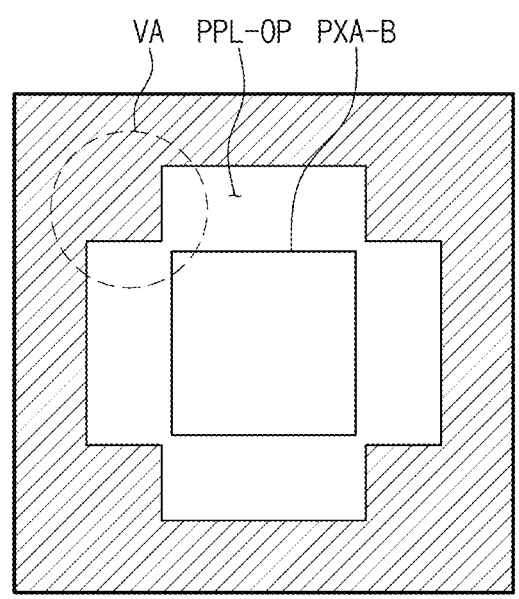
Figure 8E:
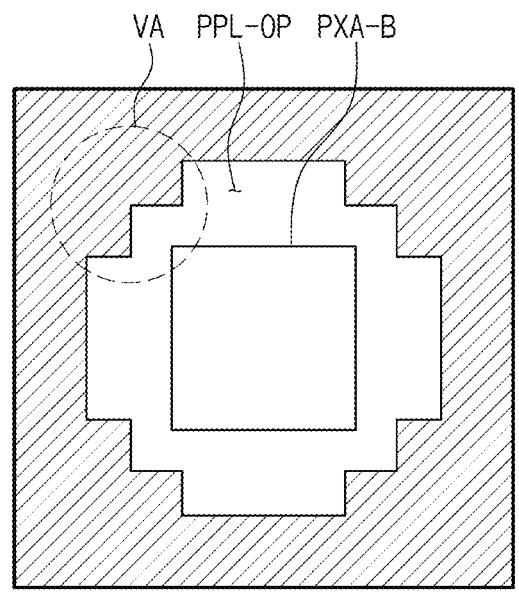

Referring to FIGS. 8C to 8E, in these embodiments, the opening PPL-OP may only include vertices each having an internal angle of 90° or substantially 90°. In this case, the number of vertices may be greater than or equal to six. When an opening PPL-OP includes six or less vertices, each having the internal angle of 90° or substantially 90°, the opening PPL-OP may have a square shape or a rectangular shape as described above.

According to one or more embodiments, as the number of vertices is increased, a variation area VA is defined in a square shape or a rectangular shape. A plurality of variation areas VA may be defined to be adjacent to the vertices of the emission region PXA-B. In other words, each of the vertices of the emission region PXA-B may be adjacent to a corresponding variation area from among the variation areas VA. The variation area VA is the same or substantially the same as a variation point defined in a square shape or a rectangular shape.

In Equation 1, a side of a square shape or a rectangular shape means that Rx corresponds to infinity. The definition of the variation point means that an area where Rx is smaller than infinity occurs. Therefore, the increase in vertices other than the four vertices means that the Rx value decreases even when the internal angle of the vertex is 90°. As a result, when the variation area VA increases, the capillary pressure relatively increases.

Figure 8F:
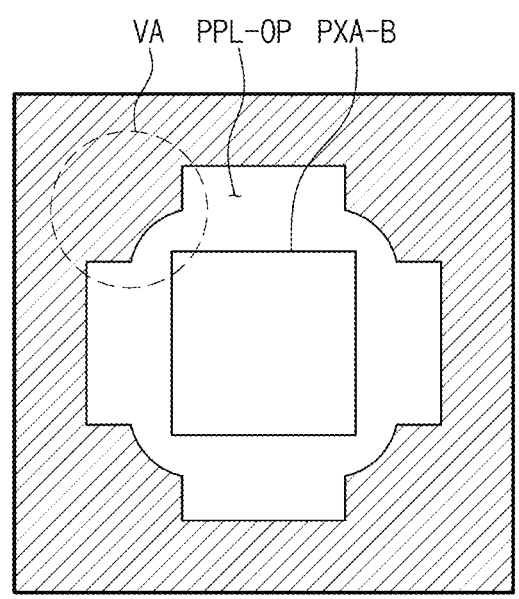

As shown in FIG. 8F, when there are six or more vertices having an internal angle of 90°, a vertex having an internal angle greater than 90° may be disposed at (e.g., in or on) the variation area VA. In addition, some of the sides connecting two adjacent vertices to each other may be curved. Nevertheless, the opening PPL-OP shown in FIG. 8F may increase the capillary pressure when compared to that of an opening having a rectangular, square, or circular shape.

Figure 8G:
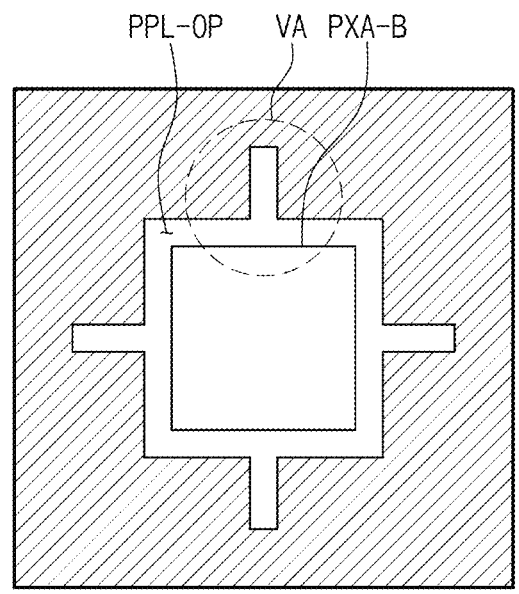
Figure 8H:
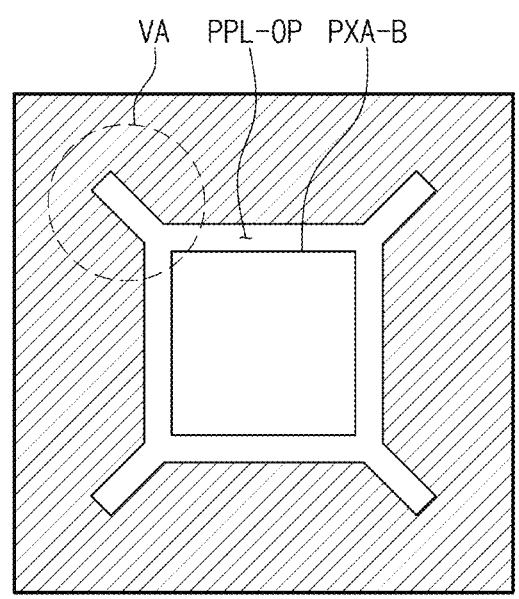

The opening PPL-OP shown in FIGS. 8G and 8H is similar to the opening PPL-OP shown in FIG. 8C, and when viewed in a plan view, the variation area VA has a shape protruding outward from the center CP (e.g., refer to FIG. 7A) of the opening PPL-OP. A width of the variation area VA shown in FIGS. 8G and 8H is relatively narrower than a width of the variation area VA shown in FIG. 8C. In an embodiment of the present disclosure, the opening PPL-OP may include both the variation area VA shown in FIG. 8G and the variation area VA shown in FIG. 8H.

Figure 8I:
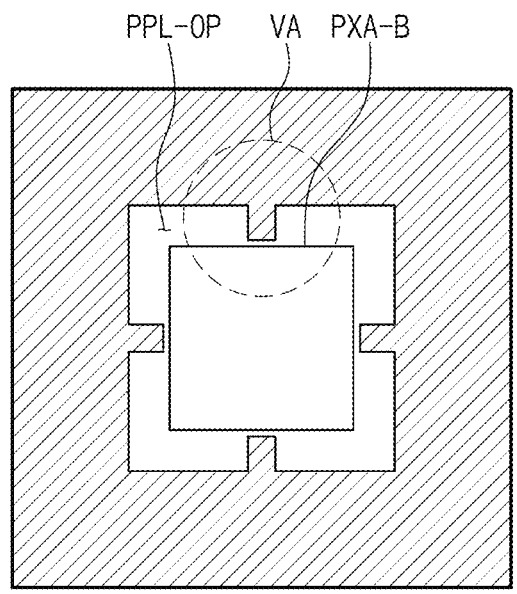
Figure 8J:
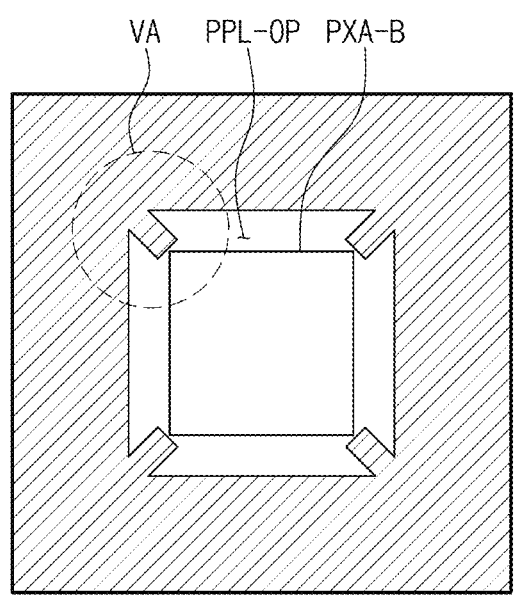

The opening PPL-OP illustrated in FIGS. 8I and 8J is similar to the opening PPL-OP illustrated in FIG. 8D, and when viewed in a plan view, the variation area VA has a concave shape that extends inward toward the center CP (e.g., refer to FIG. 7A) of the opening PPL-OP. A width of the variation area VA shown in FIGS. 8I and 8J is relatively narrower than the width of the variation area VA shown in FIG. 8D. The variation area VA shown in FIG. 8I and the variation area VA shown in FIG. 8J correspond to slits having different extension directions from one another. In an embodiment of the present disclosure, the opening PPL-OP may include both the variation area VA shown in FIG. 8I and the variation area VA shown in FIG. 8J.

All of the openings PPL-OP shown in FIGS. 8A to 8J may have a shape that is symmetrical or substantially symmetrical relative to the virtual line passing through the center of the opening PPL-OP, like that of the opening PPL-OP shown in FIG. 7A.

Figure 9A:
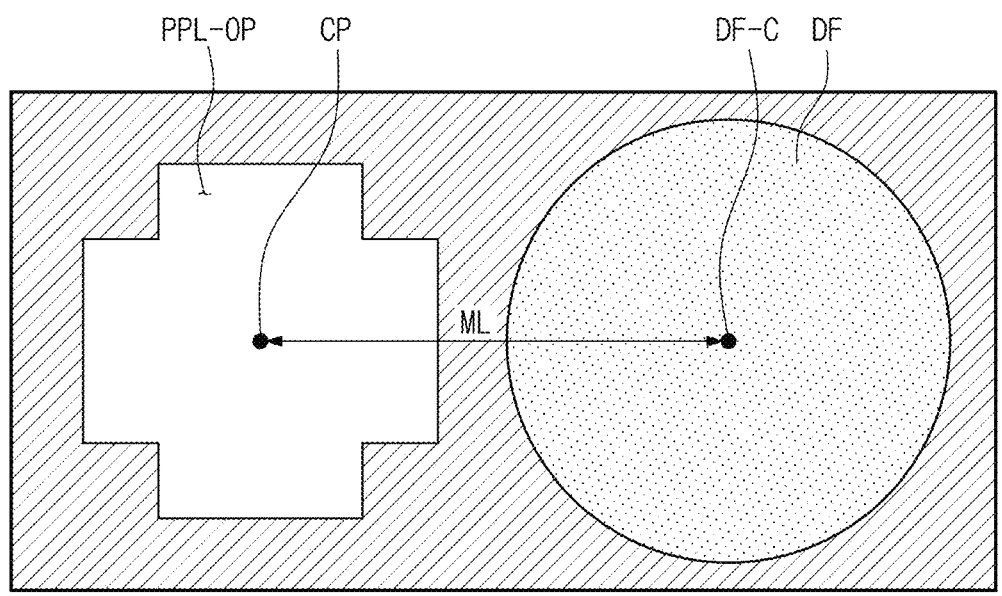
FIG. 9A is a plan view illustrating an arrangement between an opening of an organic layer and a droplet of a fluid composition.
Figure 9B:
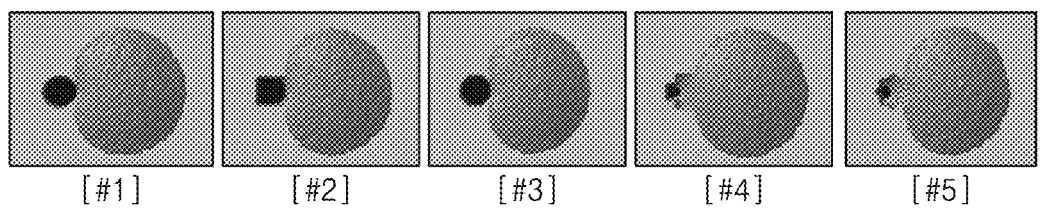
FIG. 9B illustrates simulated images of a case where a droplet of a fluid composition flows into an opening of an organic layer, in display devices according to comparative examples and examples of the present disclosure.
Figure 9C:
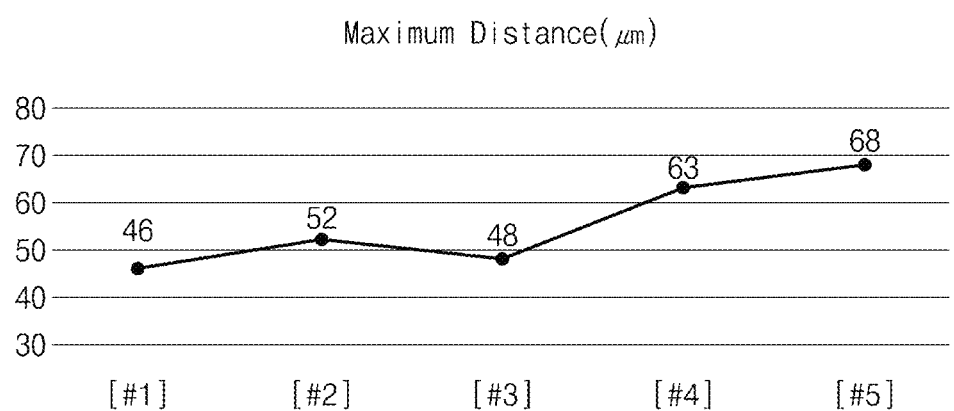
FIG. 9C illustrates a graph simulating a maximum distance by which a droplet of a fluid composition is capable of flowing into an opening of an organic layer, in display devices according to comparative examples and examples of the present disclosure.

FIG. 9A is a plan view illustrating an arrangement between the opening PPL-OP of the organic layer PPL-1 and the fluid composition droplet DF. FIG. 9B illustrates simulated images of a case where the fluid composition droplet DF flows into the opening PPL-OP of the organic layer PPL-1, in display devices according to comparative examples and examples of the present disclosure. FIG. 9C illustrates a graph simulating a maximum distance by which a droplet of the fluid composition droplet DF is capable of flowing into the opening PPL-OP of the organic layer PPL-1, in display devices according to comparative examples and examples of the present disclosure.

In FIG. 9A, the maximum distance ML is defined as a maximum value of a distance between the center CP of the opening PPL-OP through which the fluid composition droplet DF flows into the opening PPL-OP of the organic layer PPL-1 and a center DF-C of the fluid composition droplet DF.

FIG. 9B shows images of first to third comparative examples #1 to #3, a first example #4 according to an embodiment of the present disclosure, and a second example #5 according to an embodiment of the present disclosure. According to the first comparative example #1, because a circular opening PPL-OP has no vertices, the Rx has a relatively large value. The circular opening PPL-OP has a smaller capillary pressure Pc than that of a polygonal opening. According to the second comparative example #2, a capillary pressure Pc is small because the Rx corresponds to infinity at (e.g., in or on) a side of a straight line, and the fluid composition droplet DF flows into the opening PPL-OP at two vertices because a relatively large capillary pressure Pc is at the two vertices.

According to the third comparative example #3, a regular octagonal shape has a larger radius of curvature at a vertex than that of a square shape. Therefore, a capillary pressure Pc at a vertex of the octagonal shape is smaller than that of the square shape.

According to the first example #4, because a cross shape has a larger number of vertices than that of a square shape, the fluid composition droplet DF may relatively easily flow into the opening PPL-OP.

According to the second example #5, because a star shape has a larger number of vertices than that of the cross shape, and has a large curvature and a small radius of curvature at a vertex, the fluid composition droplet DF may flow more easily into the opening PPL-OP.

Referring to FIG. 9C, the graph shows that the second example #5 according to an embodiment of the present disclosure has the largest maximum distance ML that it can travel to fill the opening PPL-OP for at least the reasons described above with reference to FIG. 9B. In addition, the first comparative example #1 has the smallest maximum distance ML that it can travel to fill the opening PPL-OP, and the maximum distance ML of the third comparative example #3 is smaller than the maximum distance ML of the second comparative example #2.

According to one or more embodiments described above, even when the fluid composition droplet is not dropped at a desired location point due to a process error, the fluid composition droplet may flow well into the opening of the organic layer. Because the opening may have the above-described vertices and one or more of the above-described shapes, a large capillary pressure may act on the fluid composition droplet, and thus, the fluid composition droplet may easily flow into the opening.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:
1. A display device comprising:
   a display panel comprising an emission region, and a peripheral region adjacent to the emission region, the emission region comprising a light emitting element, and an upper insulating layer covering the light emitting element;
   an input sensor configured to detect an external input, and comprising:
      a first insulating layer directly on the upper insulating layer;
      a second insulating layer on the first insulating layer; and
      a conductive mesh line directly on the second insulating layer and overlapping with the peripheral region;
   an organic layer on the second insulating layer and covering the conductive mesh line located between the organic layer and the second insulating layer, the organic layer having an opening corresponding to the emission region to expose the second insulating layer of the input sensor;
   a light blocking pattern on the organic layer, and overlapping with the peripheral region; and
   a planarization layer on the organic layer, and filling the opening;

wherein the opening has a shape comprising first vertices and second vertices in a plan view, wherein each of the first vertices has an internal angle of 90° or less, wherein, in the plan view, each of the first vertices is located farther from a center of the opening than a corresponding adjacent second vertex from among the second vertices, wherein, in the plan view, each of the first vertices is located farther from a periphery of an emission opening defining the emission region than the corresponding adjacent second vertex, wherein the light blocking pattern exposes a part of a top surface of the organic layer, and wherein the planarization layer covers the light blocking pattern and contacts the part of the top surface of the organic layer exposed by the light blocking pattern.

2. The display device of claim 1, wherein each of the second vertices has an internal angle greater than 90° and less than 270°.

3. The display device of claim 2, wherein a number of the first vertices is equal to m, where m is a natural number greater than or equal to 4.

4. The display device of claim 3, wherein each of the second vertices is located between two corresponding first vertices that are adjacent to each other from among the first vertices, and wherein a number of the second vertices is greater than or equal to m−2.

5. The display device of claim 3, wherein the number of the first vertices is equal to a number of the second vertices, and is an even number.

6. The display device of claim 1, wherein the opening has a polygonal shape in the plan view having n or more sides, where n is a natural number greater than or equal to 6.

7. The display device of claim 1, wherein the opening is defined by a plurality of sides in the plan view, and each of the plurality of sides connects two corresponding vertices that are closest to each other from among the first vertices and the second vertices, and wherein each of the plurality of sides is a straight side.

8. The display device of claim 1, wherein the opening is defined by a plurality of sides in the plan view, and each of the plurality of sides connects two corresponding vertices that are closest to each other from among the first vertices and the second vertices, and wherein one of the plurality of sides is a curved side.

9. The display device of claim 1, wherein a refractive index of the planarization layer is greater than a refractive index of the organic layer.

10. The display device of claim 1, wherein the organic layer comprises an inclined surface defining the opening, and wherein an obtuse angle is defined between an upper surface of the second insulating layer that is exposed from the opening and the inclined surface.

11. The display device of claim 1, wherein the conductive mesh line defines a sensor opening corresponding to the emission region.

12. The display device of claim 1, wherein the display panel further comprises a pixel defining layer having the emission opening defining the emission region, wherein the light emitting element comprises a first electrode, an emission layer on the first electrode, and a second electrode on the emission layer, wherein the emission opening exposes a part of the first electrode, and wherein the emission opening is located inside the opening in the plan view.

13. The display device of claim 12, wherein the emission opening has a shape comprising a plurality of vertices, each of the vertices having an internal angle of 90°.

14. The display device of claim 1, wherein the planarization layer comprises a base resin, and particles mixed with the base resin, and wherein the particles comprise at least one of Zirconia ($ZrO_2$), Titania ($TiO_2$), or Silica ($SiO_2$).

15. The display device of claim 14, wherein the base resin comprises at least one of an acrylate-based resin, an epoxide-based resin, a siloxane-based resin, a polyimide-based resin, a zirconium and hafnium acrylates-based resin, or a brominated aromatic acrylate-based resin.

16. A display device comprising:

a display panel comprising an emission region, and a peripheral region adjacent to the emission region, the emission region comprising a light emitting element, and an upper insulating layer covering the light emitting element;

an input sensor configured to detect an external input, and comprising:
  a first insulating layer directly on the upper insulating layer;
  a second insulating layer on the first insulting layer; and
  a conductive mesh line directly on the second insulating layer and overlapping with the peripheral region;

an organic layer on the second insulating layer and covering the conductive mesh line located between the organic layer and the second insulating layer, the organic layer having an opening corresponding to the emission region to expose the second insulating layer of the input sensor;

a light blocking pattern on the organic layer, and overlapping with the peripheral region; and a planarization layer on the organic layer, and filling the opening, wherein the opening has a shape comprising first vertices and second vertices in a plan view, wherein each of the first vertices has an internal angle of 90° or less, wherein each of the second vertices has an internal angle greater than 90°, wherein, in the plan view, each of the first vertices is located farther from a center of the opening than a corresponding adjacent second vertex from among the second vertices, wherein, in the plan view, each of the first vertices is located farther from a periphery of an emission opening defining the emission region than the corresponding adjacent second vertex, wherein a number of the first vertices is greater than or equal to 6, and is an even number, wherein the light blocking pattern exposes a part of a top surface of the organic layer, and wherein the planarization layer covers the light blocking pattern and contacts the part of the top surface of the organic layer exposed by the light blocking pattern.

17. The display device of claim 16, wherein the shape of the opening in the plan view is symmetrical with respect to a virtual line passing through a center of the opening.

18. The display device of claim 16, wherein the display panel further comprises a pixel defining layer having the emission opening defining the emission region, and a light emitting element located to correspond to the emission opening, wherein the light emitting element comprises a first electrode, an emission layer on the first electrode, and a second electrode on the emission layer, wherein the emission opening exposes a part of the first electrode, and wherein the emission opening is located inside the opening in the plan view.

19. The display device of claim 18, wherein the emission opening has a shape comprising a plurality of vertices, each of the vertices having an internal angle of 90°.

\* \* \* \* \*